US011002889B2

(12) United States Patent
Arima et al.

(10) Patent No.: US 11,002,889 B2
(45) Date of Patent: May 11, 2021

(54) REFLECTIVE DIFFUSER PLATE, DISPLAY DEVICE, PROJECTION DEVICE, AND LIGHTING DEVICE

(71) Applicant: DEXERIALS CORPORATION, Tokyo (JP)

(72) Inventors: Mitsuo Arima, Tokyo (JP); Tsutomu Nagahama, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 202 days.

(21) Appl. No.: 16/472,619

(22) PCT Filed: Dec. 5, 2017

(86) PCT No.: PCT/JP2017/043624
§ 371 (c)(1),
(2) Date: Jun. 21, 2019

(87) PCT Pub. No.: WO2018/123465
PCT Pub. Date: Jul. 5, 2018

(65) Prior Publication Data
US 2020/0386919 A1   Dec. 10, 2020

(30) Foreign Application Priority Data
Dec. 28, 2016   (JP) .............................. JP2016-256464

(51) Int. Cl.
*G02B 27/10*   (2006.01)
*G02B 3/00*   (2006.01)
*G02B 5/02*   (2006.01)

(52) U.S. Cl.
CPC ......... *G02B 3/0056* (2013.01); *G02B 3/0043* (2013.01); *G02B 5/0221* (2013.01)

(58) Field of Classification Search
CPC ... G02B 3/0056; G02B 3/0043; G02B 5/0221
(Continued)

(56) References Cited

U.S. PATENT DOCUMENTS 5,903,392 A   5/1999 Kojima et al.
2004/0021810 A1   2/2004 Kawaguri et al.
(Continued)

FOREIGN PATENT DOCUMENTS

JP   H03-192232 A   8/1991
JP   2004-145330 A   5/2004
(Continued)

OTHER PUBLICATIONS

Jul. 13, 2020, European Search Report issued for related EP application No. 17886466.6.
(Continued)

*Primary Examiner* — William Choi
(74) *Attorney, Agent, or Firm* — Paratus Law Group, PLLC

(57) ABSTRACT

There is provided a reflective diffuser plate to achieve more uniform diffusion angle distribution properties. The reflective diffuser plate is a microlens array reflective diffuser plate including a single lens group positioned on a surface of a transparent base material. There are variations in aperture diameter and radius of curvature that respective single lenses constituting the single lens group have in the single lens group as a whole, and vertex positions of the respective single lenses are located irregularly. A luminance distribution of reflected light of light vertically incident on the single lens group is substantially uniform in a predetermined diffusion angle range. For at least light incident on the single lens group from certain directions, a relation of $0.3 \leq A/B \leq 1$ holds where A represents a reflection luminance value in the surface normal direction, and B represents a peak reflection luminance value of a diffuse reflection component.

10 Claims, 21 Drawing Sheets

(58) Field of Classification Search
USPC .......................................................... 359/619
See application file for complete search history.

(56) References Cited

U.S. PATENT DOCUMENTS

2012/0257281 A1    10/2012  Takagi
2019/0293843 A1*    9/2019  Ripoll ................. G02B 5/0221

FOREIGN PATENT DOCUMENTS

| JP | 2006-500621 A | 1/2006 |
| JP | 2016-186601 A | 10/2016 |
| WO | WO 2004/027495 A2 | 4/2004 |
| WO | WO 2010/005205 A2 | 1/2010 |
| WO | WO 2016/051766 A1 | 4/2016 |
| WO | WO 2016/051785 A1 | 4/2016 |
| WO | WO 2016/143350 A1 | 9/2016 |

OTHER PUBLICATIONS

Jan. 29, 2021, Chinese Office Action issued for related CN application No. 201780081206.3.

* cited by examiner

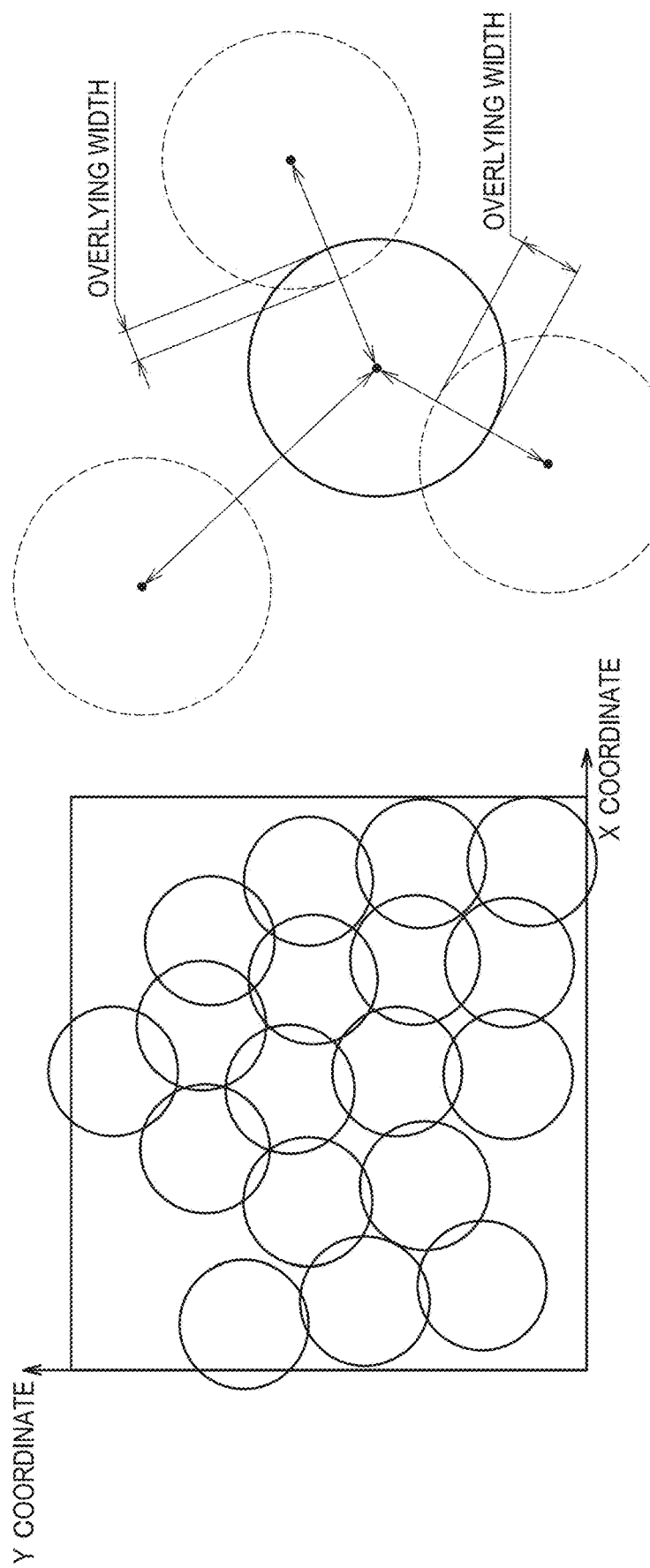

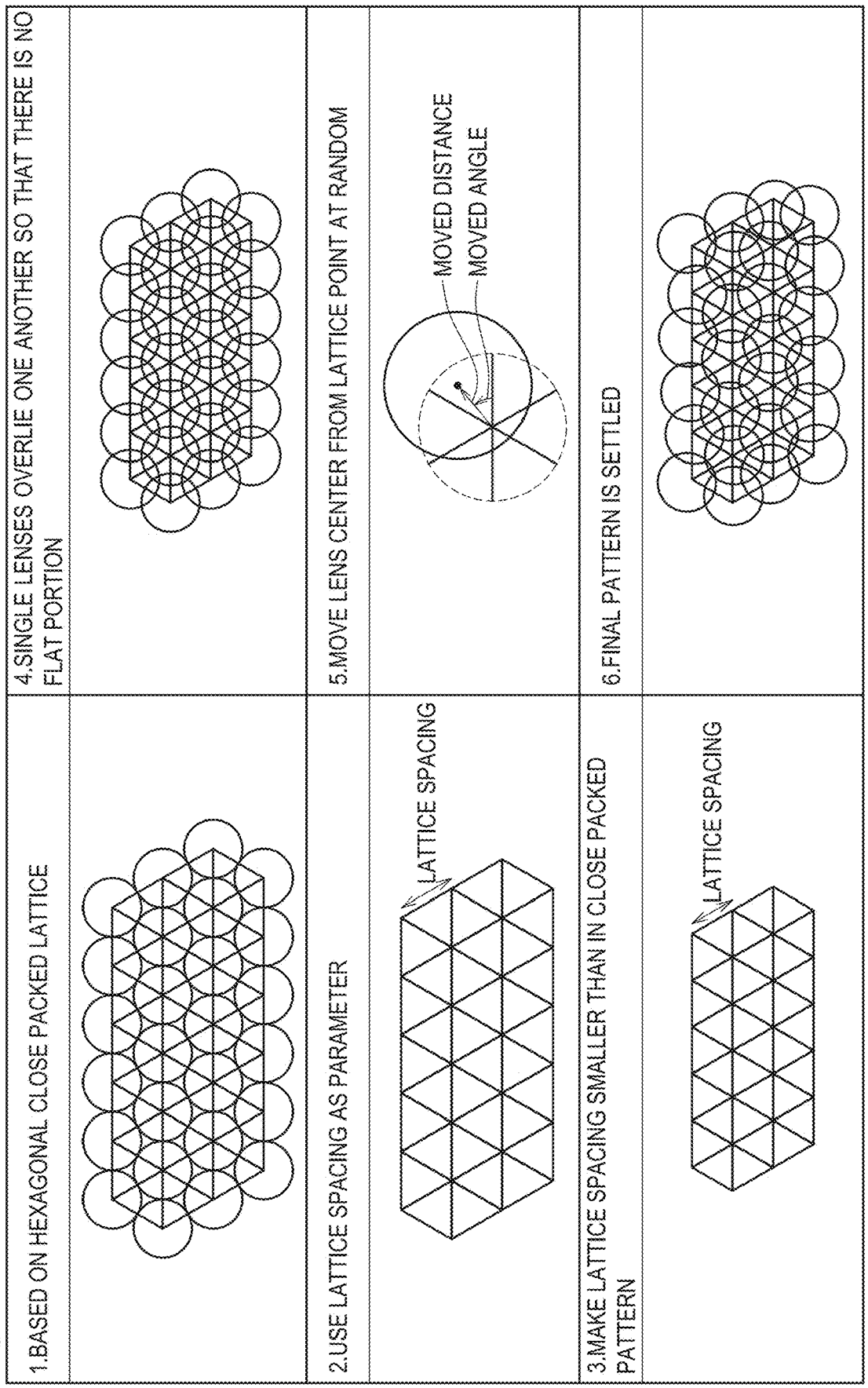

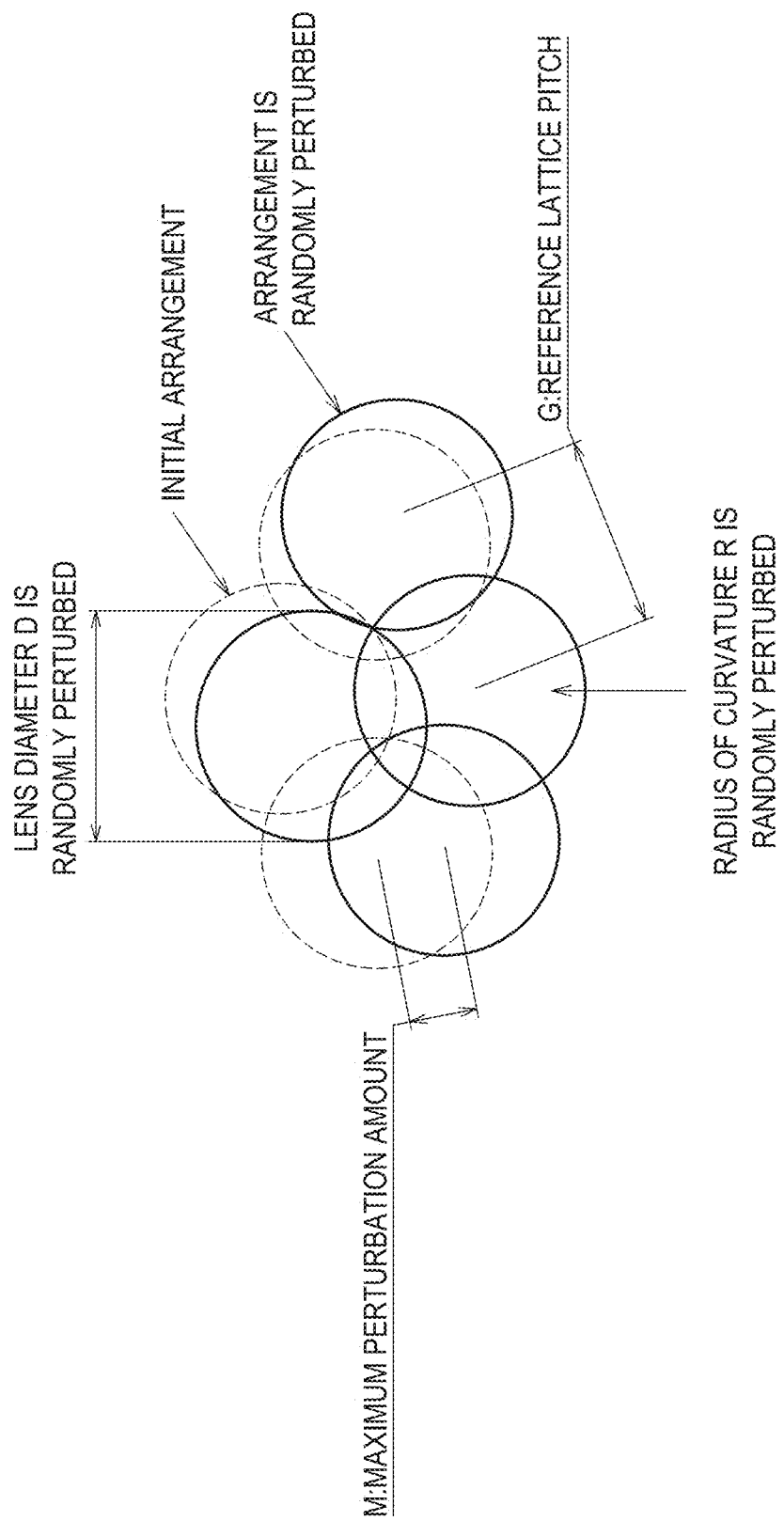

FIG. 8
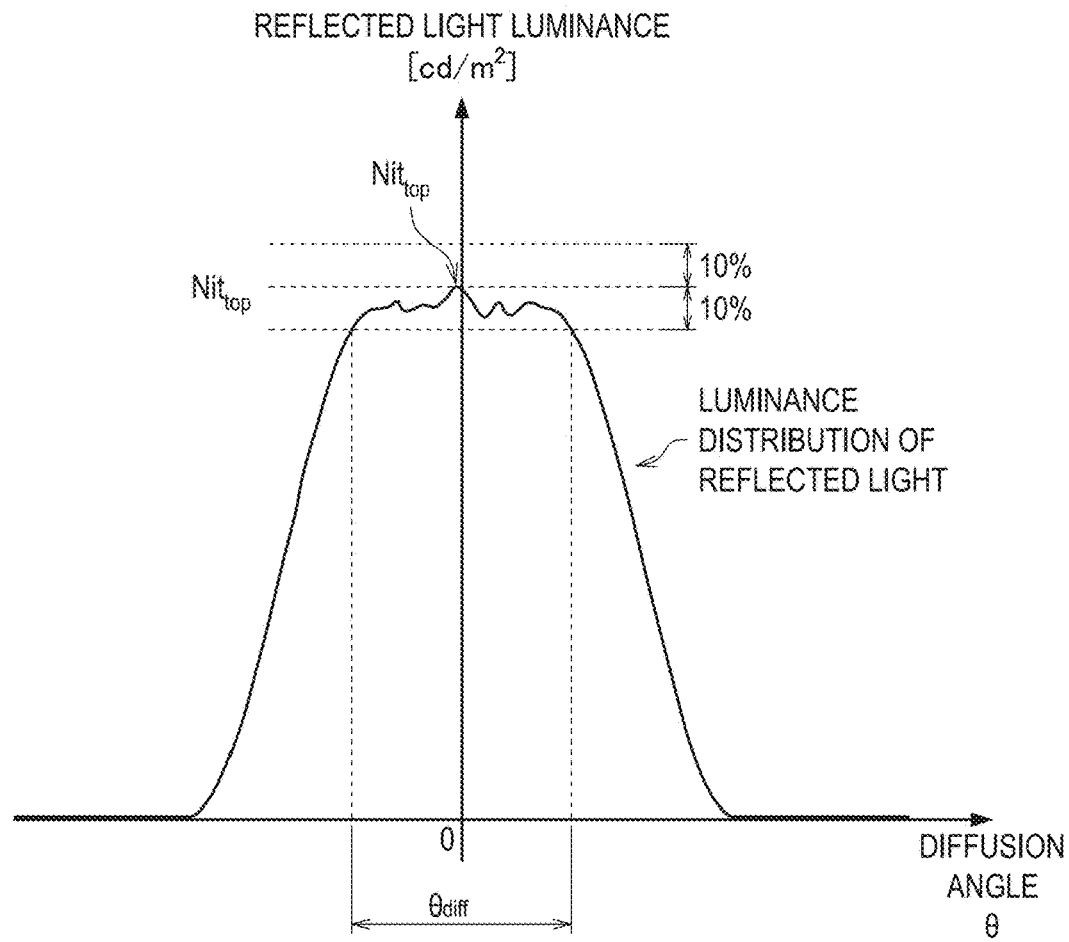
REFLECTED LIGHT LUMINANCE [cd/m²]
$Nit_{top}$
$Nit_{top}$
10%
10%
LUMINANCE DISTRIBUTION OF REFLECTED LIGHT
$\theta_{diff}$
DIFFUSION ANGLE $\theta$
FIG. 9
DISTRIBUTION OF DIFFUSELY REFLECTED LIGHT
<ACCEPTED EXAMPLE>
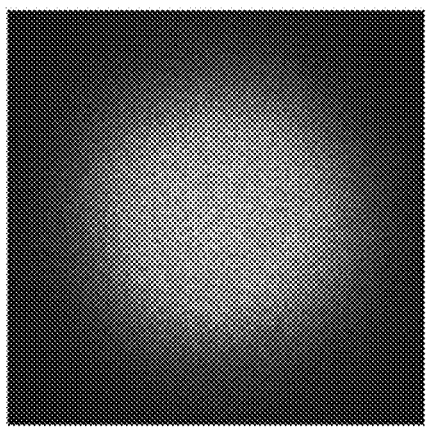
D=80 μm, R=100 μm, δ=5 %
Ov=40 μm
DISTRIBUTION OF DIFFUSELY REFLECTED LIGHT
<REJECTED EXAMPLE>
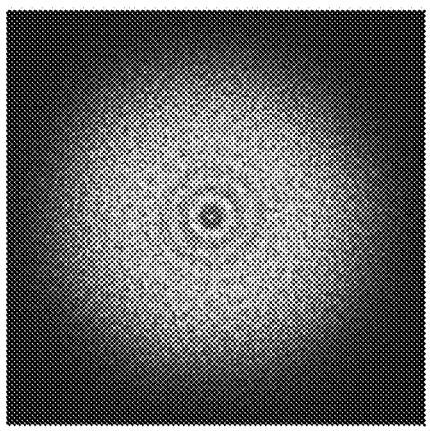
D=80 μm, R=500 μm, δ=0 %
Ov=36 μm

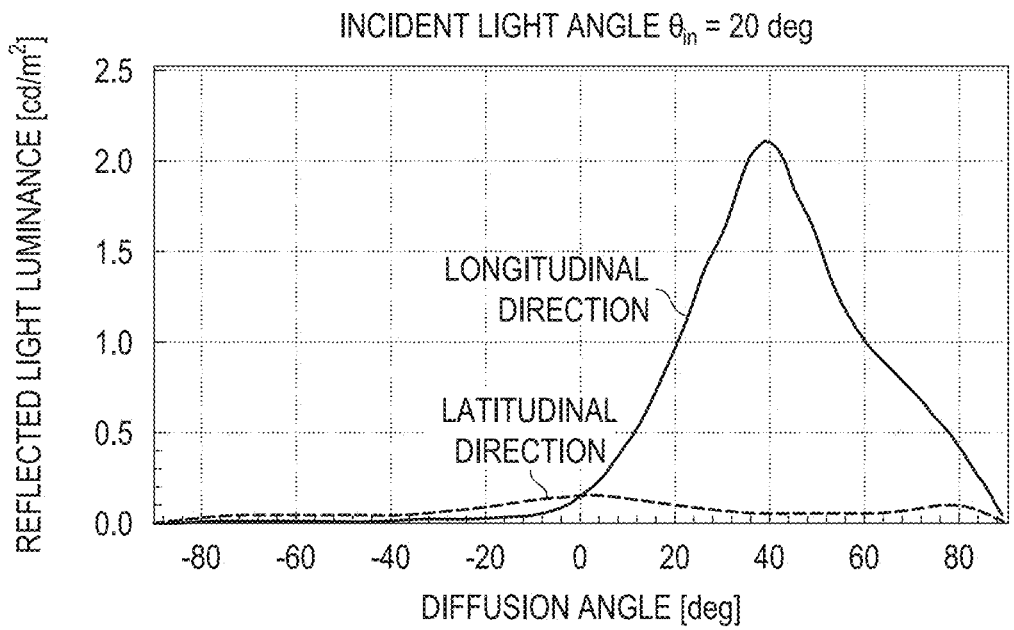

FIG. 18
| SURFACE SHAPE | REFLECTED LIGHT DISTRIBUTION |
|---|---|
| 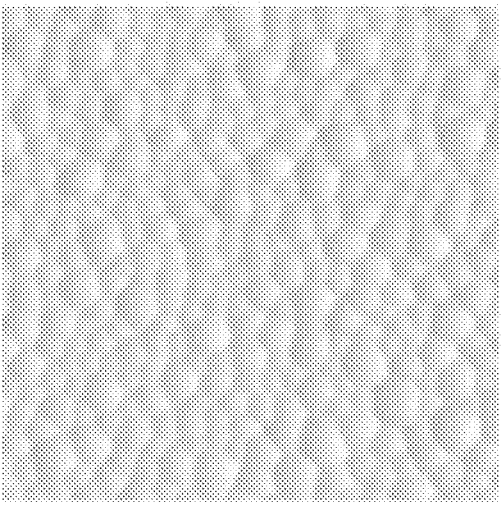 | 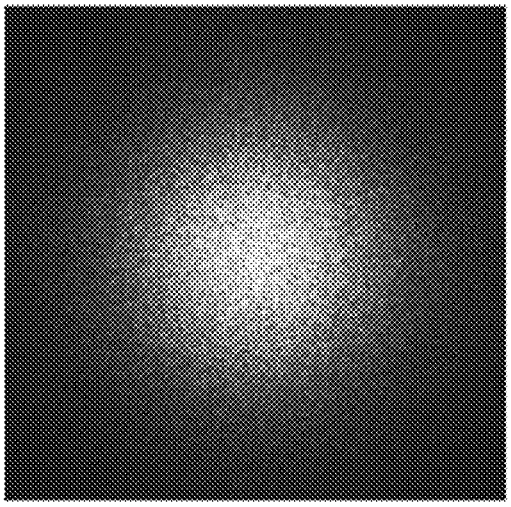 DIFFUSE REFLECTIVITY: ACCEPTED |
FIG. 19
| SURFACE SHAPE | REFLECTED LIGHT DISTRIBUTION |
|---|---|
| 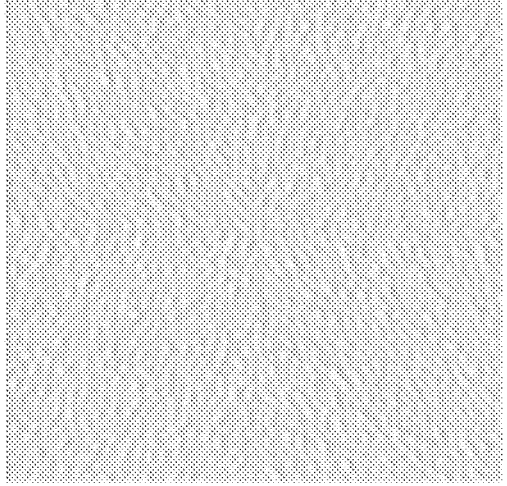 | 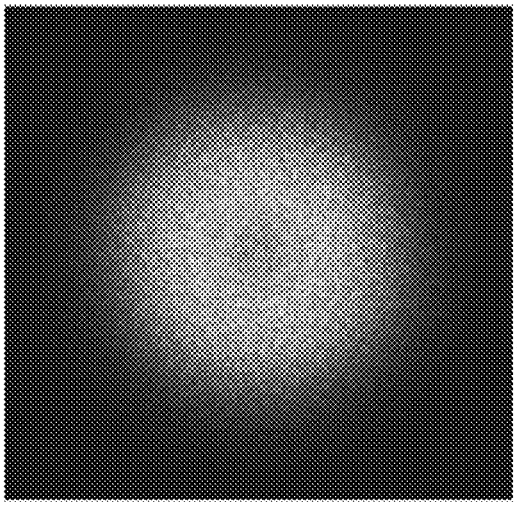 DIFFUSE REFLECTIVITY: REJECTED | ical Field

REFLECTIVE DIFFUSER PLATE, DISPLAY DEVICE, PROJECTION DEVICE, AND LIGHTING DEVICE

CROSS REFERENCE TO PRIOR APPLICATION

This application is a National Stage Patent Application of PCT International Patent Application No. PCT/JP2017/043624 (filed on Dec. 5, 2017) under 35 U.S.C. § 371, which claims priority to Japanese Patent Application No. 2016-256464 (filed on Dec. 28, 2016), which are all hereby incorporated by reference in their entirety.

TECHNICAL FIELD

The present invention relates to a reflective diffuser plate, a display device, a projection device, and a lighting device.

BACKGROUND ART

A diffuser plate that scatters incident light to various directions is widely utilized in various devices such as, for example, a display device such as a display, a projection device such as a projector, and various types of lighting devices. An incident light diffusing mechanism in this diffuser plate is roughly classified into a mechanism that utilizes light refraction resulting from the surface shape of the diffuser plate and a mechanism that utilizes scattering by a substance existing inside a bulk body and having a different refractive index from the surroundings. One of the diffuser plates that utilize light refraction resulting from the surface shape is what is called a microlens array diffuser plate including a plurality of microlenses having sizes of approximately several tens of micrometers and located on the surface of the bulk body.

As this microlens array diffuser plate, Patent Literature 1 below discloses a diffuser plate for a reticle, and this diffuser plate is designed to have variations in pitch and height of microlenses. Specifically, Patent Literature 1 below discloses setting a microlens pitch P such that 8 µm≤P≤30 µm holds and setting a microlens height H such that 0.01× P≤H≤0.1×P holds.

Further, as a microlens array diffuser plate, Patent Literature 2 below discloses that a light diffusion effect is imparted to the lens surface by setting a diameter (D) of microlenses constituting a microlens array at more than or equal to 100 µm and less than or equal to 1000 µm and setting a surface roughness (Ra) of the microlenses at more than or equal to 0.1 µm and less than or equal to 10 µm. In this Patent Literature 2, a locating pattern of the microlenses is a random locating pattern similarly to Patent Literature 1 above, but introduction of randomness for the microlens height is denied stating that stress concentration can be suppressed by keeping the microlens height constant.

CITATION LIST

Patent Literature

Patent Literature 1: JP H3-192232A
Patent Literature 2: JP 2004-145330A

SUMMARY OF INVENTION

Technical Problem

However, Patent Literature 1 above fails to mention the radius of curvature of each microlens, and has a problem in that it is difficult to achieve more uniform (flat) diffusion angle distribution properties. Further, even if the technology disclosed in Patent Literature 2 above is used, it is difficult to achieve more uniform (flat) diffusion angle distribution properties.

Thus, the present invention was made in view of the above-described problem, and the present invention has an object to provide a reflective diffuser plate, a display device, a projection device, and a lighting device that enable more uniform diffusion angle distribution properties to be achieved.

Solution to Problem

According to an aspect of the present invention in order to solve the above-described problem, there is provided a microlens array reflective diffuser plate including a single lens group positioned on a surface of a transparent base material, in which there are variations in aperture diameter and radius of curvature that respective single lenses constituting the single lens group have in the single lens group as a whole, and vertex positions of the respective single lenses are located irregularly, a luminance distribution of reflected light of light vertically incident on the single lens group is substantially uniform in a predetermined diffusion angle range, and for at least either light incident on the single lens group from a direction that forms an angle of 20 degrees with a surface normal direction of the transparent base material or light incident on the single lens group from a direction that forms an angle of 40 degrees with the surface normal direction of the transparent base material, a relation of $0.3 \leq A/B \leq 1$ holds where A represents a reflection luminance value in the surface normal direction, and B represents a peak reflection luminance value of a diffuse reflection component.

It is preferable that a relation expressed by Expression (1) below holds where D [µm] represents the aperture diameter, R [µm] represents the radius of curvature, and δ [%] represents a variation proportion of each of the aperture diameter D and the radius of curvature R.

$$\delta \geq \frac{\sqrt{R}}{80^2} \cdot (D-115)^2 - 3 \qquad \text{Expression (1)}$$

It is preferable that a boundary between one of the single lenses and an adjacent one of the single lenses includes curves different from each other.

It is preferable that a reflective layer is further provided on a surface of the single lens group.

The reflective layer may be a metal layer containing either Al or Ag, or an inorganic reflective layer containing either $TiO_2$ or ZnS.

It is preferable that the respective single lenses constituting the single lens group are located irregularly on the transparent base material, and a relation expressed by Expression (2) below holds where $O_V$ [µm] represents a maximum value of an overlying width between two of the single lenses adjacent to each other, and $D_1$ [µm] and $D_2$ [µm] respectively represent aperture diameters of the two single lenses adjacent to each other.

$$\frac{D_1 + D_2}{4} \geq O_V \qquad \text{Expression (2)}$$

The transparent base material may be any of a resin substrate, a resin film, and a glass substrate.

Further, according to another aspect of the present invention in order to solve the above-described problem, there is provided a display device including the above-described diffuser plate.

Further, according to another aspect of the present invention in order to solve the above-described problem, there is provided a projection device including the above-described diffuser plate.

Further, according to another aspect of the present invention in order to solve the above-described problem, there is provided a lighting device including the above-described diffuser plate.

Advantageous Effects of Invention

According to the present invention as described above, more uniform diffusion angle distribution properties can be achieved.

BRIEF DESCRIPTION OF DRAWINGS

FIG. 6A is an explanatory diagram for describing a method of locating the single lens group that the reflective diffuser plate according to the embodiment includes.

FIG. 7A is an explanatory diagram for describing a method of locating the single lens group that the reflective diffuser plate according to the embodiment includes.

FIG. 7B is an explanatory diagram for describing the method of locating the single lens group that the reflective diffuser plate according to the embodiment includes.

FIG. 8 is an explanatory diagram schematically showing a luminance distribution of reflected light from the reflective diffuser plate according to the embodiment.

FIG. 9 is an explanatory diagram for describing a method of determining distribution properties of diffusely reflected light.

FIG. 16C is a graph showing a test result of Test Example 1 related to the reflective diffuser plate.

FIG. 17 is a graph showing a test result of Test Example 1 related to the reflective diffuser plate.

FIG. 18 is a graph showing a test result of Test Example 1 related to the reflective diffuser plate.

FIG. 19 is a graph showing a test result of Test Example 1 related to the reflective diffuser plate.

DESCRIPTION OF EMBODIMENTS

Figure 1:
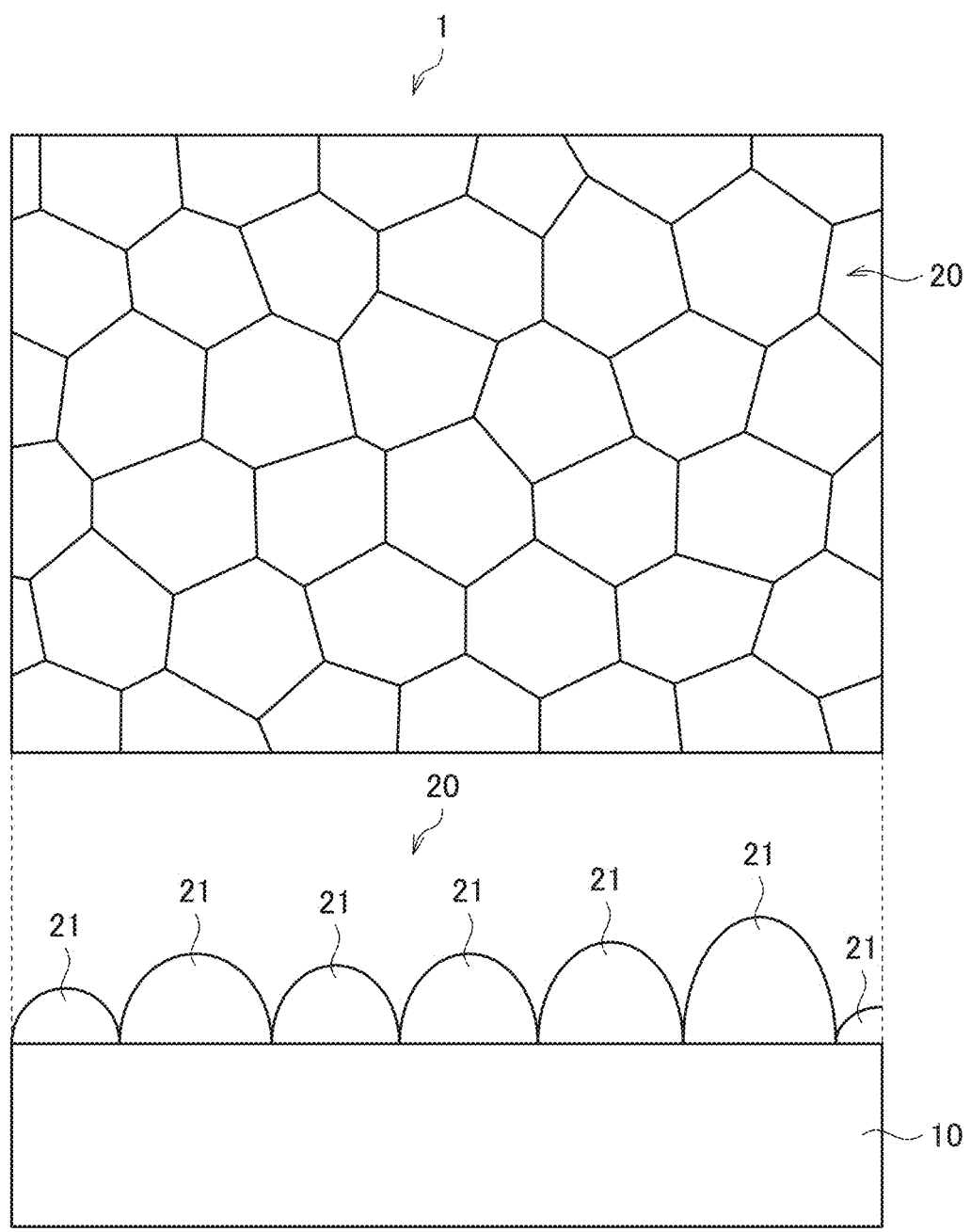
FIG. 1 is an explanatory diagram schematically showing a structure of a reflective diffuser plate according to an embodiment of the present invention.

Hereinafter, (a) preferred embodiment(s) of the present invention will be described in detail with reference to the appended drawings. Note that, in the present specification and the drawings, structural elements that have substantially the same function and structure are denoted with the same reference numerals, and repeated explanation is omitted.

(Overview of Reflective Diffuser Plate According to Embodiment of Present Invention)

Prior to describing a reflective diffuser plate according to an embodiment of the present invention in detail, an overview of the reflective diffuser plate according to an embodiment of the present invention will be mentioned below briefly.

The reflective diffuser plate according to an embodiment of the present invention which will be described below in detail is a microlens array reflective diffuser plate having light homogeneous diffusion and optical aperture homogeneous expanding functions. An optical body (that is, microlens) that this reflective diffuser plate has is a structure characterized in that convex surfaces having the light diffusion function have different shapes from one another, and that a boundary contour of each lens is in contact with an adjacent lens with a different curve.

In a case of optical bodies with a conventional microlens array structure as disclosed in Patent Literature 1 and Patent Literature 2 above, a general Gaussian light diffusion function and a moiré reducing function in imaging equipment may only be added, and there is a problem in that it is difficult to satisfy diffusion properties of homogeneous energy distribution. That is, there is a problem in that an issue concerning an optical function (hereinafter also referred to as "top hat type diffusion") that, with respect to collimated light in a visible light region and telecentric light having a principal ray with a collimating property and having a certain aperture, homogeneity of energy distribution is very high within an angular component in a certain region, and if the certain region of this angular component is exceeded, energy may be reduced abruptly cannot be resolved.

The reflective diffuser plate according to an embodiment of the present invention which will be described below in detail is an optical body characterized in that, with respect to collimated light in a visible light region and telecentric light having a principal ray with a collimating property and having a certain aperture, homogeneity of a reflective component is very high within an angular component in a certain region of vertical incident light, and the ratio between specular reflection luminance and diffusion luminance of oblique incident light is controlled.

More specifically, in the reflective diffuser plate according to an embodiment of the present invention, the location, radius of curvature, and circular aperture diameter of respective unit cells (that is, microlenses which are single lenses) constituting the microlens array are perturbed (in other words, varied). Accordingly, the reflective diffuser plate according to an embodiment of the present invention has an optical body including a large number of bends and curved surfaces. The optical body has a plurality of bent and curved surface regions different from one another, the boundaries of the regions being curved surfaces different from one another, and a look-down projection trajectory in which tangent orientations are mutually different are sectioned with different curves. Accordingly, it is possible to solve the above-described problem and to achieve an optical body having both a high homogeneous diffusion function and an optical aperture control function, which are not obtained in conventional Gaussian light diffusion.

Characteristics of the reflective diffuser plate which will be described below in detail are as follows.

1) A curved surface portion of a single lens (microlens) constituting the microlens array is a spherical body or an aspherical body.

2) The location of single lenses constituting the microlens array is a random location. 3) By optimally selecting a reference aperture diameter D, a reference radius of curvature R, and a perturbation amount δ of the single lenses constituting the microlens array, homogeneity of diffusely reflected light can be achieved.

4) A region having neither a bend nor a curved surface (in other words, the extent of a flat portion of an optical body in which the microlens array is located) is less than 5%.

5) The boundaries of respective bent regions in the microlens array are curved surfaces different from one another.

6) The reflective diffuser plate may have a reflective layer on a surface of the microlens array.

7) The reflection distribution of 0-degree incident light (vertical incident light) on the microlens array exhibits top hat properties within a desired diffusion angle range.

8) $0.3 \leq A/B \leq 1.0$ holds where A represents a reflection luminance value in the surface normal direction on the microlens array, and B represents a peak reflection luminance value of 20-degree incident light or 40-degree incident light.

Hereinafter, the reflective diffuser plate according to an embodiment of the present invention having characteristics as described above will be described in detail.

(With Regard to Reflective Diffuser Plate)

Hereinafter, with reference to FIG. 1 to FIG. 12C, a reflective diffuser plate 1 according to a first embodiment of the present invention will be described in detail.

Figure 2:
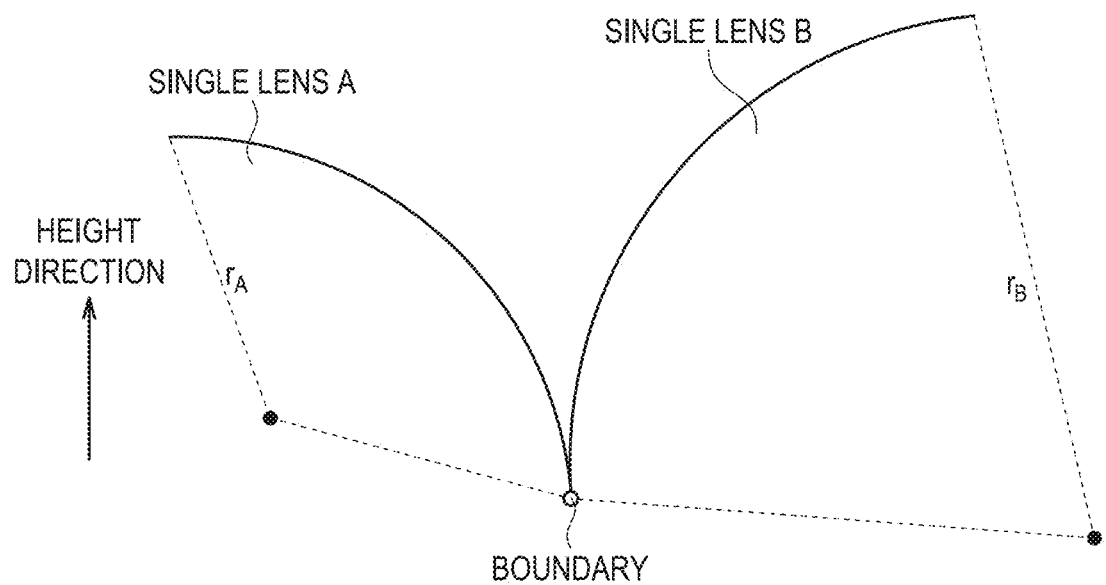
FIG. 2 is an explanatory diagram for describing single lenses that the reflective diffuser plate according to the embodiment has.
Figure 3:
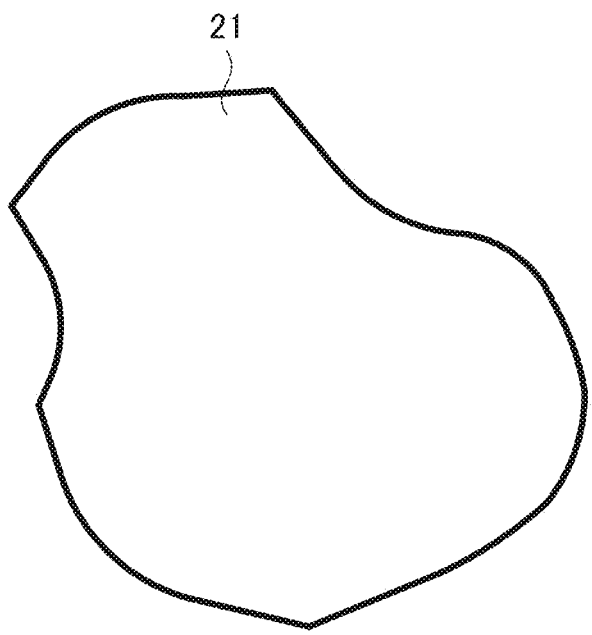
FIG. 3 is an explanatory diagram for describing single lenses that the reflective diffuser plate according to the embodiment has.
Figure 4:
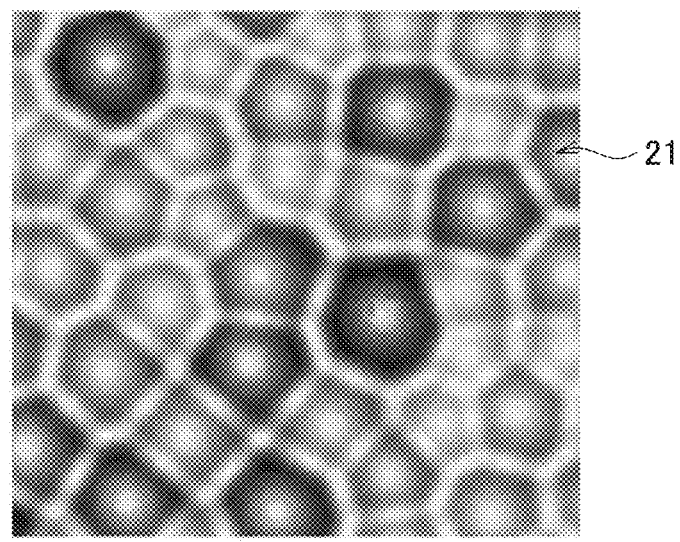
FIG. 4 is an electron micrograph of an example of a single lens group that the reflective diffuser plate according to the embodiment includes as seen from above.
Figure 5:
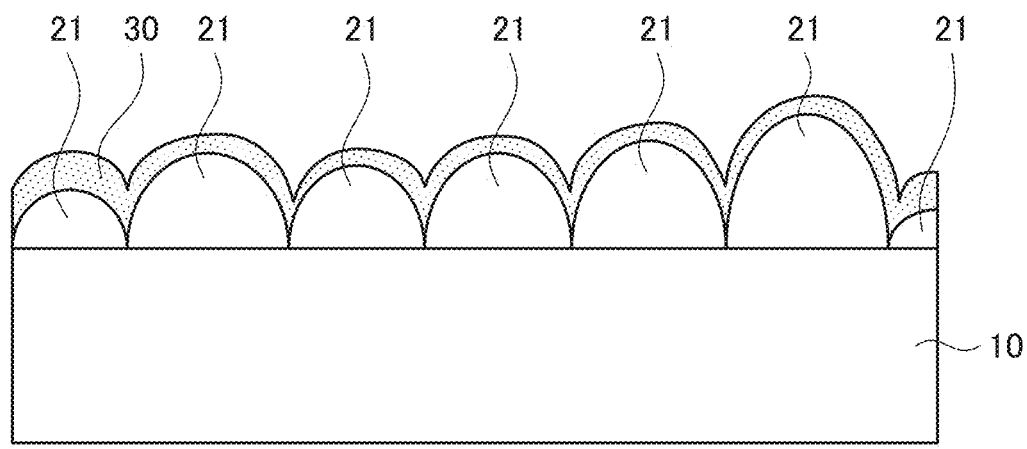
FIG. 5 is an explanatory diagram schematically showing a structure of the reflective diffuser plate according to the embodiment.
Figure 10A:
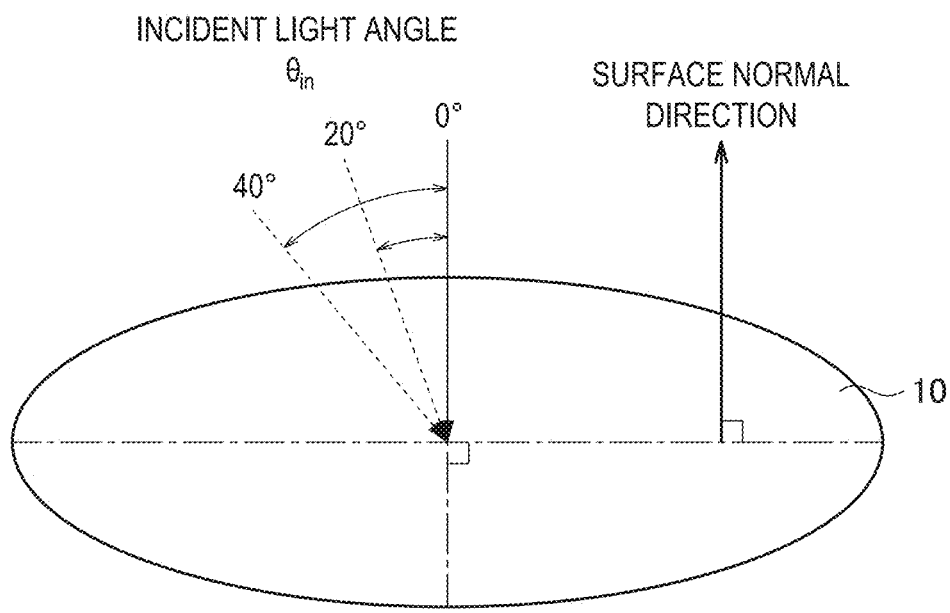
FIG. 10A is an explanatory diagram for describing diffuse reflection properties of the reflective diffuser plate according to the embodiment.
Figure 10B:
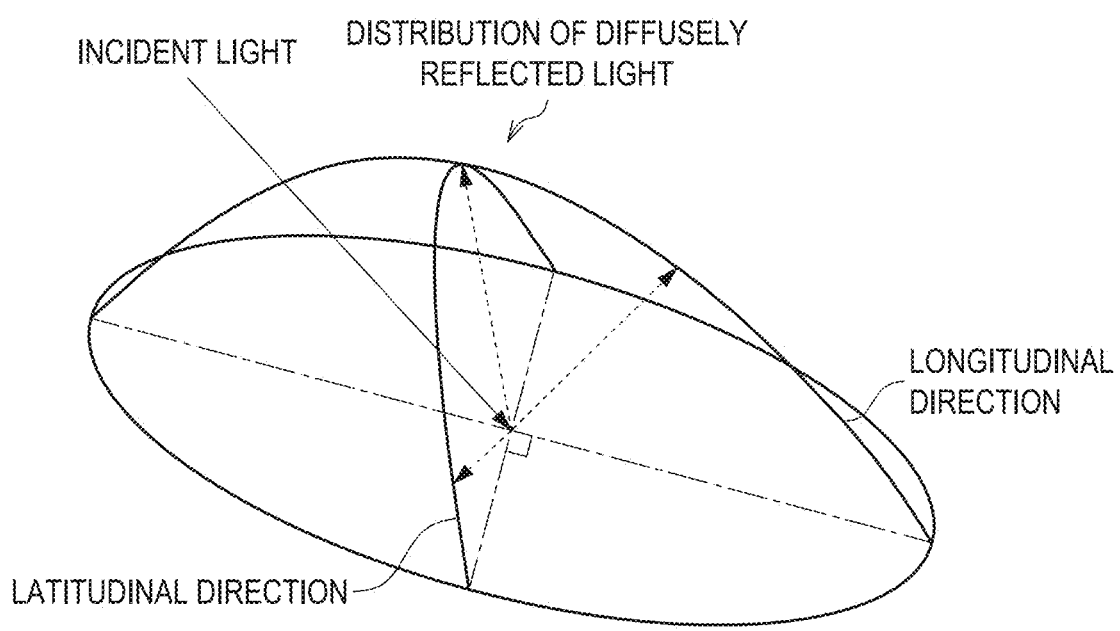
FIG. 10B is an explanatory diagram for describing diffuse reflection properties of the reflective diffuser plate according to the embodiment.
Figure 11A:
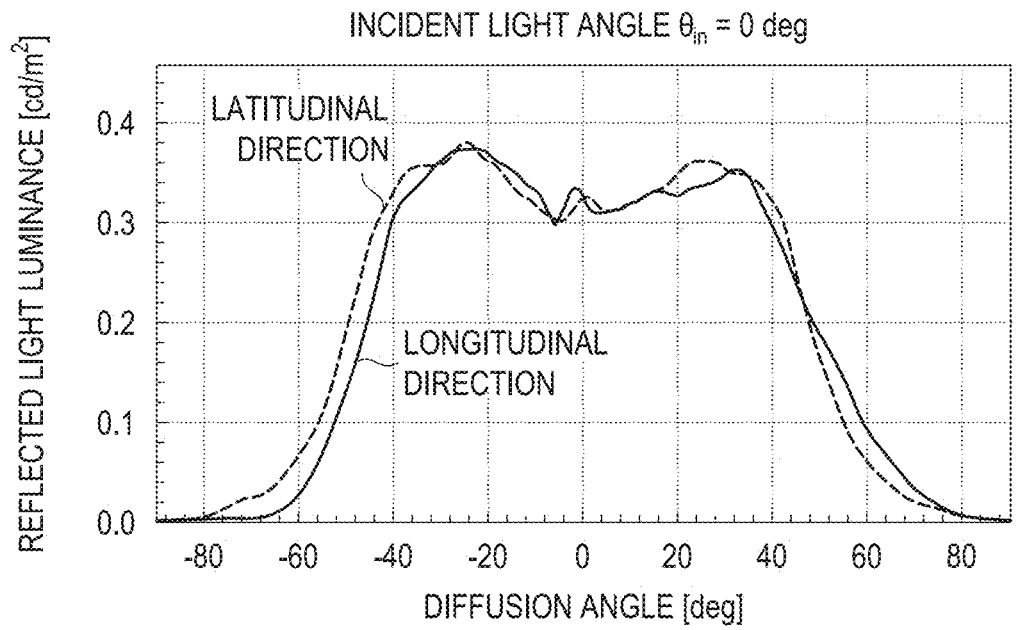
FIG. 11A is an explanatory diagram for describing diffuse reflection properties of the reflective diffuser plate according to the embodiment.
Figure 11B:
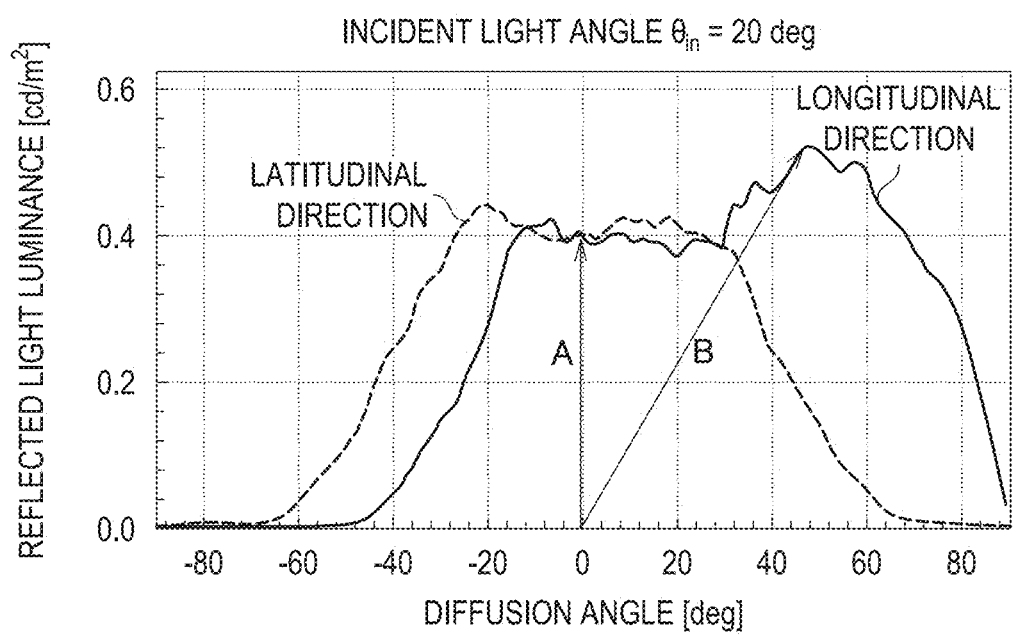
FIG. 11B is an explanatory diagram for describing diffuse reflection properties of the reflective diffuser plate according to the embodiment.
Figure 12A:
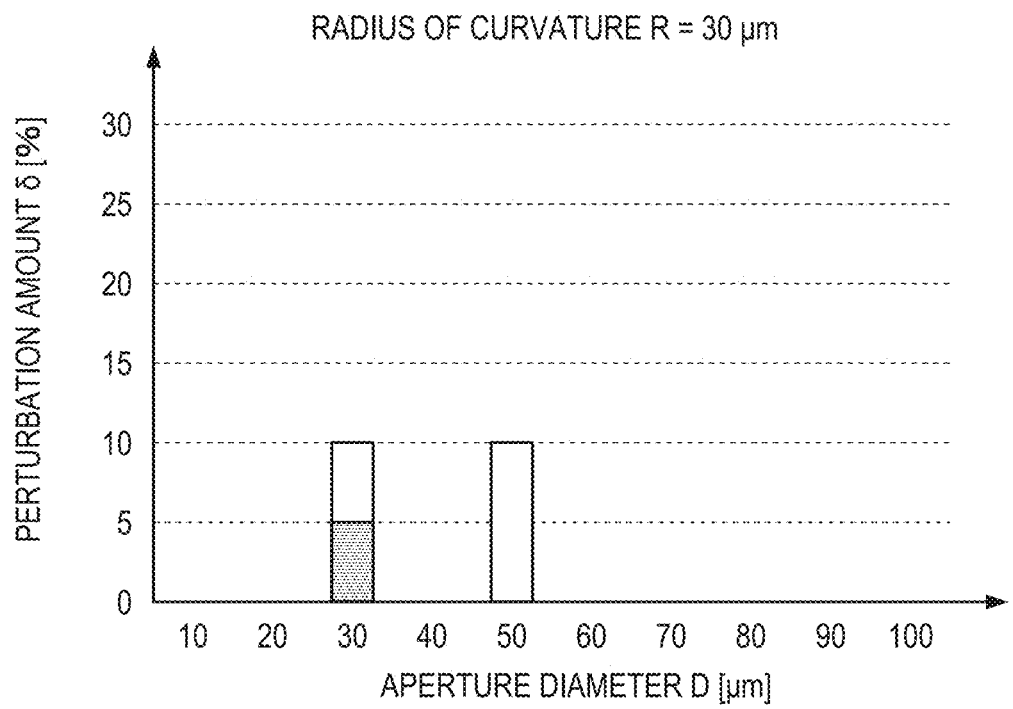
FIG. 12A is a graph for describing a relation between aperture diameter, radius of curvature, perturbation amount, and distribution properties of diffusely reflected light.
Figure 12B:
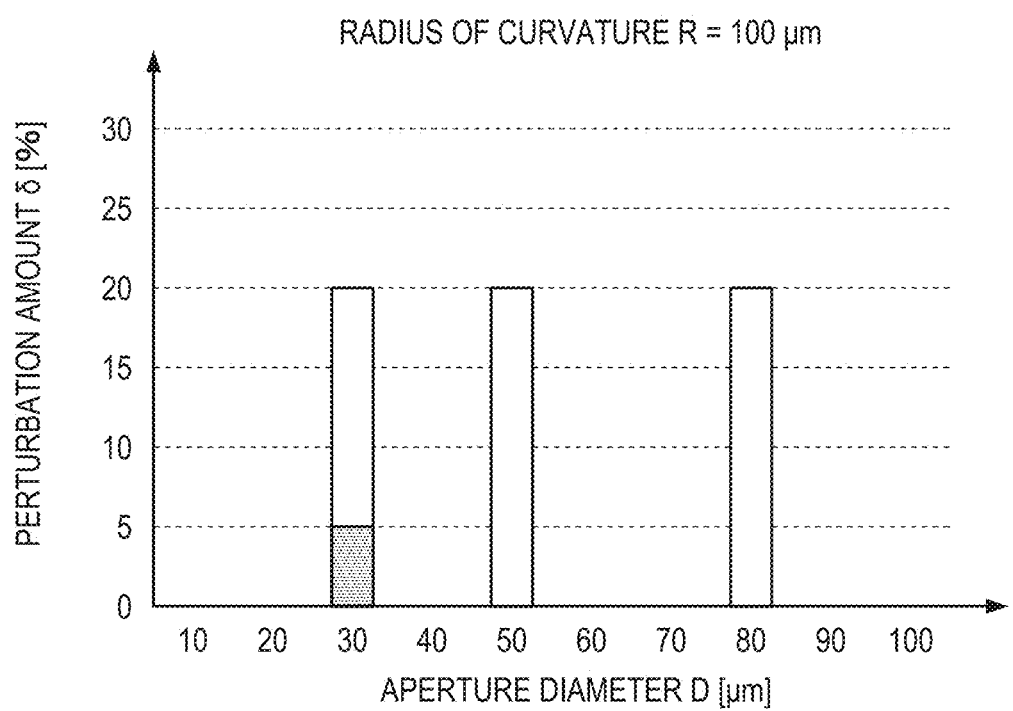
FIG. 12B is a graph for describing a relation between aperture diameter, radius of curvature, perturbation amount, and distribution properties of diffusely reflected light.
Figure 12C:
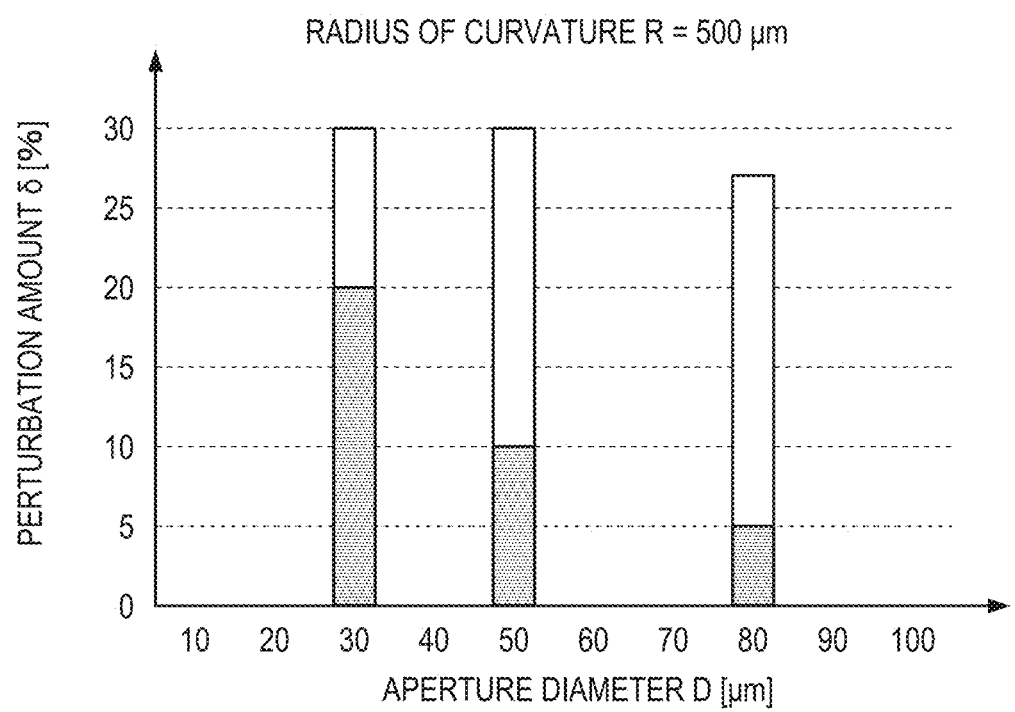
FIG. 12C is a graph for describing a relation between aperture diameter, radius of curvature, perturbation amount, and distribution properties of diffusely reflected light.

FIG. 1 is an explanatory diagram schematically showing a structure of the reflective diffuser plate according to the present embodiment. FIG. 2 and FIG. 3 are explanatory diagrams each for describing single lenses that the reflective diffuser plate according to the present embodiment has. FIG. 4 is an electron micrograph of an example of a single lens group that the reflective diffuser plate according to the present embodiment includes as seen from above. FIG. 5 is an explanatory diagram schematically showing a structure of the reflective diffuser plate according to the present embodiment. FIG. 6A to FIG. 7B are explanatory diagrams each for describing a method of locating the single lens group that the reflective diffuser plate according to the present embodiment includes. FIG. 8 is an explanatory diagram schematically showing a luminance distribution of reflected light from the reflective diffuser plate according to the present embodiment. FIG. 9 is an explanatory diagram for describing a method of determining distribution properties of diffusely reflected light. FIG. 10A and FIG. 10B are explanatory diagrams each for describing diffuse reflection properties of the reflective diffuser plate according to the present embodiment. FIG. 11A and FIG. 11B are explanatory diagrams each for describing diffuse reflection properties of the reflective diffuser plate according to the present embodiment. FIG. 12A to FIG. 12C are graphs each for describing a relation between aperture diameter, radius of curvature, perturbation amount, and distribution properties of diffusely reflected light.

The reflective diffuser plate 1 according to the present embodiment is a microlens array reflective diffuser plate including a plurality of microlenses (hereinafter, also referred to as "single lenses") located on a base material. This reflective diffuser plate 1 has a transparent base material 10 and a single lens group 20 formed on a surface of the transparent base material 10, as schematically shown in FIG. 1.

<With Regard to Transparent Base Material 10>

The transparent base material 10 is a base material made of a material that can be assumed as being transparent in a wavelength band of light incident on the reflective diffuser plate 1 according to the present embodiment. This transparent base material 10 may be a film-like material or may be a plate-like material. The material of this base material is not particularly limited. It is also possible to use publicly-known resin such as polymenthyl methacrylate (PMMA), Polyethylene terephthalate (PET), polycarbonate (PC), Cyclo Olefin Copolymer (COC), Cyclo Olefin Polymer (COP), or Triacetylcellulose (TAC), for example, as the transparent base material 10, and it is also possible to use publicly-known optical glass such as quartz glass, borosilicate glass, or high transmission crown glass. Although FIG. 1 presents an illustration using a case in which the transparent base material 10 is rectangular as an example, the shape of the transparent base material 10 is not limited to rectangle, but may have any shape depending on the shape of a display device, a projection device, a lighting device, or the like in which the reflective diffuser plate 1 is mounted, for example.

<With Regard to Single Lens Group 20>

The single lens group 20 composed of a plurality of single lenses 21 is formed on the surface of the transparent base material 10. In the reflective diffuser plate 1 according to the present embodiment, it is preferable that the single lens group 20 is formed in such a manner that the plurality of single lenses 21 are adjacent to each other (in other words, in such a manner that a gap (flat portion) does not exist between the single lenses 21) as schematically shown in FIG. 1. By locating the single lenses 21 on the transparent base material 10 without a gap (in other words, locating the single lenses 21 in such a manner that the filling rate of the single lenses is 100%), a component of incident light that transmits through the diffuser plate surface as it is without scattering on the diffuser plate surface (hereinafter, also referred to as a "0-th order transmitted light component") can be reduced. As a result, in the single lens group 20 including the plurality of single lenses 21 located adjacent to each other, diffusion performance can be improved further.

Further, in the single lens group 20 according to the present embodiment, each single lens 21 is not located regularly, but is located irregularly (at random), as schematically shown in FIG. 1. Here, "irregular" means that regularity concerning the location of the single lenses 21 does not exist practically, in an arbitrary region of the single lens group 20 in the reflective diffuser plate 1. Thus, even if a certain kind of regularity exists in the location of the single lenses 21 at a microscopic region in an arbitrary region, the arbitrary region having no regularity in the location of the single lenses 21 as a whole is assumed to be determined as "irregular". Note that an irregular locating method of the single lenses 21 in the single lens group 20 according to the present embodiment will be described below again in detail.

In the present embodiment, the single lens 21 constituting the single lens group 20 is a convex lens. Further, in the single lens group 20 according to the present embodiment, the surface shape of each single lens 21 is not particularly limited, but may only include a spherical component, or may include an aspherical component.

Further, the single lens group 20 according to the present embodiment has variations not only in the location of each single lens 21 as described above, but also in the aperture diameter and radius of curvature of each single lens 21 in the single lens group 20 as a whole.

By providing a plurality of single lenses 21 so as to be adjacent to each other, forming the single lenses 21 irregularly on the transparent base material 10, and providing variations (randomness) for the aperture diameter and radius of curvature of the respective single lenses 21, the respective single lenses 21 do not have an outer shape identical to each other, but have various shapes as schematically shown in FIG. 1, and many single lenses 21 no longer have symmetry.

In such a case, as schematically shown in FIG. 2, a situation in which a single lens A has a radius of curvature $r_A$, whereas a single lens B has a radius of curvature $r_B$ ($\neq r_A$) occurs frequently. In a case where adjacent single lenses are different in radius of curvature, the boundary between the adjacent single lenses is not composed of a straight line alone, but at least partly includes a curve, and, as schematically shown in FIG. 3, the outer shapes of the single lenses 21 (a projection trajectory of outer shapes in a case of looking down on the single lenses 21) are composed of a plurality of bent and curved boundaries different from one another. When the boundaries between single lenses at least partly include curves, regularity of the location at the boundaries between the single lenses is further broken, and a diffraction component can be reduced further.

FIG. 4 is an SEM picture in a case where part of the single lens group 20 in the reflective diffuser plate according to the present embodiment is monitored from above with a scanning electron microscope (SEM). As is apparent from FIG. 4, it is understood that the outer shapes (a look-down projection trajectory) of the single lenses 21 constituting the single lens group 20 have various shapes, and that the single lenses 21 are also different in aperture diameter from one another.

<With Regard to Reflective Layer 30>

Further, in the reflective diffuser plate 1 according to the present embodiment, it is preferable that a reflective layer 30 is further provided on the surface of each single lens 21 constituting the single lens group 20 as schematically shown in FIG. 5. By providing this reflective layer 30 on the surface of the single lens group 20, reflection performance (that is, reflectance of incident light) of the reflective diffuser plate 1 according to the present embodiment can be improved further.

This reflective layer 30 can be formed using any material as long as desired reflectance can be achieved. Examples of such a reflective layer 30 can include a metal layer containing either Al or Ag, or an inorganic reflective layer containing either $TiO_2$ or ZnS. Examples of the metal layer containing either Al or Ag can include a metal layer of Al alone, a metal layer of Ag alone, or a metal layer of an alloy containing Al or Ag such as an AgPCu alloy or the like. Further, examples of the inorganic reflective layer containing either $TiO_2$ or ZnS can include an inorganic reflective layer containing $TiO_2$ and $SiO_2$, a reflective layer containing ZnS and $SiO_2$, and the like.

Further, the thickness of this reflective layer 30 is not particularly limited. However, since it is difficult to form the reflective layer 30 having a thickness of less than 10 nm, for example, it is preferable that the thickness of the reflective layer 30 is more than or equal to 10 nm. On the other hand, in a case where the reflective layer 30 is formed using a material as described above, the thickness becomes more than or equal to 200 nm, so that a reflectance of 100% will be exhibited. Therefore, it is preferable that the thickness of the reflective layer 30 is less than or equal to 200 nm from the viewpoint of cost performance and the like. The thickness of this reflective layer 30 is more preferably more than or equal to 100 nm and less than or equal to 200 nm.

<With Regard to Method of Locating Single Lenses 21>

Hereinafter, a method of locating the single lenses 21 as described above will be specifically described.

In the reflective diffuser plate 1 according to the present embodiment, the single lens group 20 in which a plurality of single lenses 21 having characteristics as described above are located can be achieved mainly by the following two locating methods.

The first locating method is a locating method of locating the single lenses 21 having a shape to serve as a reference at random from the beginning. Hereinafter, this locating method will also be referred to as a "random locating method." In this locating method, the single lenses 21 having a shape to serve as a reference are located at random, and then the shape (that is, aperture diameter and radius of curvature) of the single lenses 21 is varied (perturbed). Therefore, as is apparent from the SEM picture showing an actual manner of location of the single lens group 20 shown in FIG. 4, regularity cannot be found in the location of the single lenses 21 even in a case of looking down on the single lens group 20 macroscopically to some degree.

The second arrangement method is a scheme of once setting a state to serve as a reference (hereinafter also referred to as an "initial arrangement state") in which the single lenses 21 having a shape to serve as a reference are arranged regularly, and then varying (perturbing) the shape (that is, aperture diameter and radius of curvature) of the single lenses 21 and the located position (in more detail, the vertex position of the single lenses 21) from the initial arrangement state. Hereinafter, this locating method will also be referred to as a "reference locating method." In this locating method, randomness is provided for the shape and location of the single lenses 21 upon regularly arranging the single lenses 21, and thus, the location is such that the initial arrangement state can be estimated to some degree when looking down on the single lens group 20 macroscopically to some degree.

[With Regard to Random Locating Method]

First, a flow of the random locating method will be briefly described with reference to FIG. 6A and FIG. 6B.

In the random locating method, in a case of considering the lens located position in the xy coordinate system as shown in FIG. 6A, the x coordinate and y coordinate of the lens located position are settled by random numbers. On this occasion, for a single lens 21 of interest, the distance from each single lens 21 already located is calculated, and if the overlying width with the single lenses 21 already located falls within a previously set allowable range, the single lens 21 of interest is located. Conversely, in a case where the calculated overlying width exceeds the allowable range, the single lens 21 of interest is not located. In this manner, the initial arrangement in the random locating method is settled.

Figure 6B:
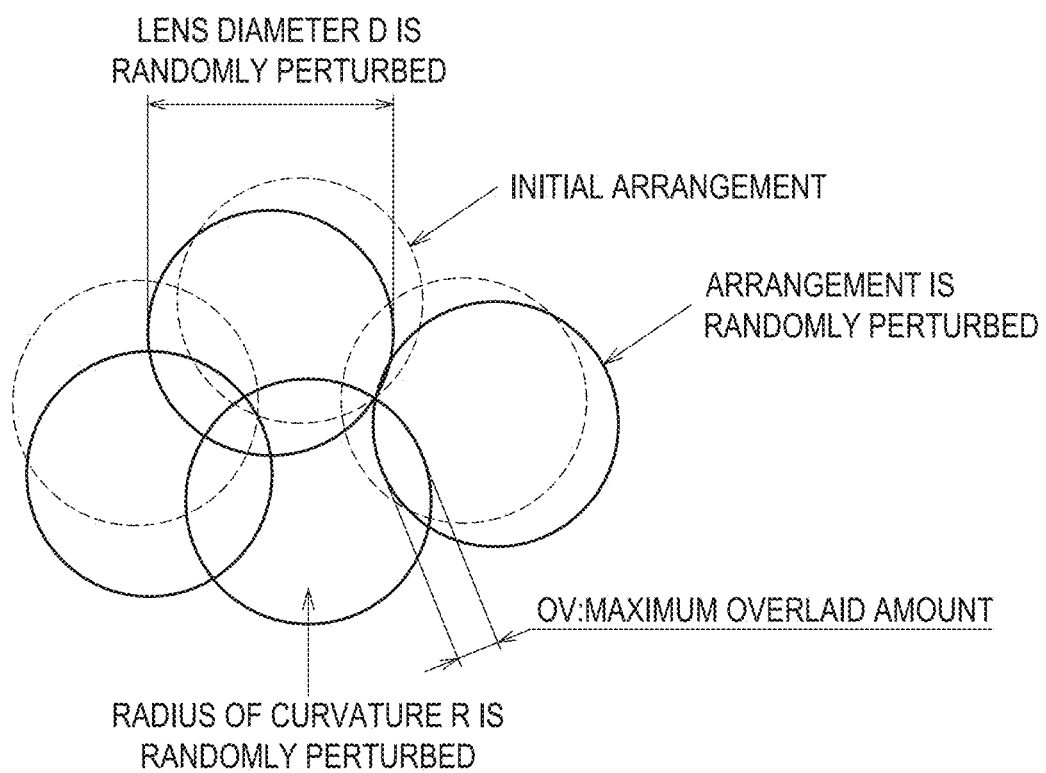
FIG. 6B is an explanatory diagram for describing the method of locating the single lens group that the reflective diffuser plate according to the embodiment includes.

The allowable range in the locating method as described above is a maximum overlaid amount $O_v$ shown in FIG. 6B. This maximum overlaid amount $O_v$ can be regarded as the maximum value of the overlying width between the single lenses 21 adjacent to each other.

The foregoing is an overview of the random locating method, and a more specific algorithm for the random locating method is not particularly limited, but a publicly-known method as disclosed in JP 2012-181816A, for example, can be utilized.

By further perturbing the aperture diameter D and the radius of curvature R of the single lenses 21 as shown in FIG. 6B as parameters after settling the initial arrangement in the above manner, the single lenses 21 having random shapes can be located at random, and occurrence of a flat portion can be suppressed.

In the random locating method as described above, it is preferable that a relation expressed by Expression (101) below holds where $O_v$ [μm] represents the maximum value of the overlying width between two single lenses 21 adjacent to each other in the single lens group 20, and $D_1$ [μm] and $D_2$ [μm] respectively represent the aperture diameters of the two single lenses 21 adjacent to each other. In a case where the relation expressed by Expression (101) below does not hold, the degree of variations in parameter for achieving the random location becomes insufficient, and it may be difficult to achieve sufficient randomness.

$$\frac{D_1 + D_2}{4} \geq O_V \qquad \text{Expression (101)}$$

[With Regard to Reference Locating Method]

Subsequently, a flow of the reference locating method will be briefly described with reference to FIG. 7A and FIG. 7B.

As shown in FIG. 7A, in the reference locating method, first, an initial arrangement state to serve as a reference is set. A regular arrangement state of the single lenses 21 is not particularly limited, but a rectangular location in which the vertex positions of the single lenses 21 are located in a square shape, a hexagonal location in which the vertex positions of the single lenses 21 are located at positions corresponding to the vertices of a hexagon and the center of the hexagon, or the like may be utilized as appropriate. On this occasion, in order to prevent a flat portion from occurring where possible in the single lens group 20 having been subjected to the reference locating method, it is preferable that the regular arrangement state is a close packed arrangement state such as a hexagonal close packed lattice.

In this reference locating method, the lattice spacing (a reference lattice pitch G in FIG. 7B) is used as a parameter, as shown in the diagram at the middle on the left side in FIG. 7A. Then, as shown in the diagram at the bottom on the left side in FIG. 7A, the lattice spacing which is a parameter is reduced from a value corresponding to the close packed pattern. Accordingly, as shown in the diagram at the top on the right side in FIG. 7A, the respective single lenses overlie one another, so that there is no flat portion.

Thereafter, as shown in the diagram at the middle on the right side in FIG. 7A, the lens center (vertex position) of each single lens 21 is moved from the lattice point at random. Specifically, using the maximum moved distance from the lattice point as a parameter (a maximum perturbation amount M in FIG. 7B), a moved distance, which is the product of a random number of 0 to 1 and the maximum moved distance, is settled individually. Further, a moved angle is also settled using a random number. Accordingly, as shown in the diagram at the bottom on the right side in FIG. 7A, the final locating pattern of the single lenses 21 is settled.

Thereafter, by further perturbing the aperture diameter D and the radius of curvature R of the single lenses 21 as shown in FIG. 7B as parameters, the single lenses 21 having random shapes can be located at random.

The method of locating the single lenses 21 according to the present embodiment has been specifically described above with reference to FIG. 6A to FIG. 7B.

<With Regard to Diffuse Reflection Properties of Reflective Diffuser Plate 1>

In the reflective diffuser plate 1 according to the present embodiment, in a case where light is vertically incident on the single lens group 20 (in other words, in a case where light is incident in the direction parallel to the surface normal direction of the transparent base material 10), the luminance distribution of reflected light of this incident light becomes substantially uniform within a predetermined diffusion angle range. In other words, the reflective diffuser plate 1 according to the present embodiment exhibits top hat type reflection properties within the predetermined diffusion angle range.

Here, the top hat type reflection properties in the present embodiment refer to that, as to the luminance distribution of reflected light of vertical incident light, a state in which reflected light luminance values fall within a range of ±10% centering on a peak value $Nit_{top}$ of reflected light luminance within a desired diffusion angle range $\theta_{diff}$ has been achieved, as schematically shown in FIG. 8.

When the state as shown in FIG. 8 is achieved, the distribution of diffusely reflected light from the reflective diffuser plate has homogeneity, and periodic diffracted light or the like no longer occurs. On the other hand, in a case where the top hat type reflection properties as shown in FIG. 8 have not been achieved, the distribution of diffusely reflected light from the reflective diffuser plate is no longer homogeneous, and there is a high possibility that periodic diffracted light or the like occurs.

In the present embodiment, in a case where the distribution of diffusely reflected light is uniform as shown in the diagram on the left side in FIG. 9, for example, it is determined that a reflective diffuser plate of interest has substantially uniform diffuse reflectivity (that is, an acceptable level has been attained) with respect to vertical incident light within a predetermined diffusion angle range. On the other hand, as shown in the diagram on the right side in FIG. 9, in a case where the distribution of diffusely reflected light is uneven and nonuniform, and in some cases a periodic diffraction pattern is observed, it is determined that a reflective diffuser plate of interest does not have substantially uniform diffuse reflectivity (that is, an acceptable level has not been attained) with respect to vertical incident light within a predetermined diffusion angle range.

Note that the diffuse reflection properties shown in the diagram on the left side in FIG. 9 are diffuse reflection properties of a reflective diffuser plate in which the reference aperture diameter D=80 µm, the reference radius of curvature R=100 µm, the perturbation amount δ=5%, and the maximum value of the overlying width between single lenses (that is, the maximum overlaid amount) $O_v$=40 µm. Further, the diffuse reflection properties shown in the diagram on the right side in FIG. 9 are diffuse reflection properties of a reflective diffuser plate in which the reference aperture diameter D=80 µm, the reference radius of curvature R=500 µm, the perturbation amount δ=0%, and the maximum overlaid amount $O_v$=36 µm.

Further, in the reflective diffuser plate 1 according to the present embodiment, a specific relation holds for light incident on the single lens group 20 from an oblique direction that forms an angle of a predetermined value with the surface normal direction of the transparent base material 10.

Specifically, attention will be paid to the luminance distribution of diffusely reflected light caused by the reflective diffuser plate 1 as to light obliquely incident on the reflective diffuser plate 1 from a direction that forms an angle $\theta_{in}$ of 20 degrees or 40 degrees with the surface normal direction of the transparent base material 10, as schematically shown in FIG. 10A. Here, in the luminance distribution of diffusely reflected light, the luminance distribution of diffusely reflected light on a plane defined by the traveling direction of incident light and the surface normal direction shall be referred to as an "luminance distribution in the longitudinal direction" below for the sake of convenience, and in the luminance distribution of diffusely reflected light, the luminance distribution of reflected light on a plane orthogonal to the plane defined by the traveling direction of incident light and the surface normal direction shall be referred to as an "luminance distribution in the latitudinal direction" below for the sake of convenience, as schematically shown in FIG. 10B.

As to light incident on the reflective diffuser plate 1 according to the present embodiment at the incident angle $\theta_{in}$=0 degree (that is, light vertically incident on the reflective diffuser plate 1 from the direction parallel to the surface normal direction), the luminance distribution of diffusely reflected light in the longitudinal direction and the luminance distribution in the latitudinal direction have substantially the same distribution shape, and the luminance distributions are substantially symmetric in the lateral direction centering on the diffusion angle=0 degree, as shown in FIG. 11A as an example.

On the other hand, as to light incident on the reflective diffuser plate 1 according to the present embodiment at the incident angle $\theta_{in}$=20 degrees or 40 degrees, the luminance distribution of diffusely reflected light in the latitudinal direction is a luminance distribution which is substantially symmetric in the lateral direction centering on the diffusion angle=0 degree similarly to the case in which the incident angle $\theta_{in}$=0 degree, whereas the luminance distribution of diffusely reflected light in the longitudinal direction is a luminance distribution which is asymmetric in the lateral direction centering on the diffusion angle=0 degree. FIG. 11B shows an example of the luminance distribution of diffusely reflected light of light incident at the incident angle $\theta_{in}$=20 degrees, and it is understood that the luminance distribution in the latitudinal direction is a luminance distribution which is substantially symmetric in the lateral direction, whereas the luminance distribution in the longitudinal direction is a luminance distribution which is asymmetric in the lateral direction.

In the present embodiment, a relation of 0.3≤A/B≤1 holds where, with respect to at least either of the luminance distributions of diffusely reflected light when obliquely incident as shown in FIG. 11B (in more detail, the luminance distribution of diffusely reflected light at the incident angle $\theta_{in}$=20 degrees or 40 degrees), A represents the reflection luminance value in the surface normal direction, and B represents a peak reflection luminance value of the diffuse reflection component.

In the case of the example shown in FIG. 11B, the reflection luminance value at the diffusion angle=0 degree is the luminance value A described above, and the peak value of the luminance distribution in the longitudinal direction in the vicinity of a diffusion angle of 50 degrees is the luminance value B described above. Note that the reason why the diffusion angle that provides the peak luminance value B is in the vicinity of 50 degrees although the incident angle $\theta_{in}$=20 degrees is because the aperture diameter and radius of curvature have predetermined variations (that is, perturbation amounts) in the single lens group of the reflective diffuser plate 1 to which attention is paid in the present embodiment.

The luminance ratio given by (A/B) described above does not take a value exceeding 1. Consequently, the upper limit value of the luminance ratio (A/B) is 1. On the other hand, in a case where the luminance ratio (A/B) has a value of less than 0.3, unevenness of the luminance distribution of diffusely reflected light is too great to make it difficult to achieve more uniform diffusion angle distribution properties. Consequently, the lower limit value of the luminance ratio (A/B) is 0.3. The value of the luminance ratio (A/B) more preferably has a range of more than or equal to 0.5 and less than or equal to 1.0.

The inventors of the present application carried out publicly-known ray tracing simulations while changing the reference aperture diameter D, the reference radius of curvature R, and the perturbation amount δ to verify diffuse reflection properties (in more detail, diffuse reflection properties of vertical incident light and diffuse reflection properties of oblique incident light as described above) of reflective diffuser plates upon the standards as described above. Specifically, the inventors of the present application conducted simulations for diffuse reflection properties of reflective diffuser plates assuming that the perturbation amount δ=0%, 5%, 10%, 20%, or 30% in a case where the reference aperture diameter D=30 μm, 50 μm, or 80 μm and the reference radius of curvature R=30 μm, 100 μm, or 500 μm.

Obtained results are schematically shown in Table 1 below and FIG. 12A to FIG. 12C. Here, in FIG. 12A to FIG. 12C, regions indicated by open bars represent regions in which diffuse reflection properties for both vertical incident light and oblique incident light are accepted.

TABLE 1

Results of evaluating diffuse reflection properties

| Reference radius of curvature R | Perturbation amount δ | Reference aperture diameter D | | |
|---|---|---|---|---|
| [μm] | [%] | 30 μm | 50 μm | 80 μm |
| 30 | 0 | rejected | rejected | — |
|  | 5 | accepted | accepted | — |
|  | 10 | accepted | accepted | — |
| 100 | 0 | rejected | rejected | rejected |
|  | 5 | rejected | accepted | accepted |
|  | 10 | accepted | accepted | accepted |
|  | 20 | accepted | accepted | accepted |
| 500 | 0 | rejected | rejected | rejected |
|  | 5 | rejected | rejected | accepted |
|  | 10 | rejected | rejected | accepted |
|  | 20 | rejected | accepted | accepted |
|  | 30 | accepted | accepted | accepted |

On the basis of obtained evaluation results as described above, the inventors of the present application conducted further studies about a relational expression providing the border between a region in which both diffuse reflection properties related to vertical incident light and diffuse reflection properties related to oblique incident light are accepted and a region in which at least either diffuse reflection properties related to vertical incident light or diffuse reflection properties related to oblique incident light are rejected. As a result, it has been found that, in a case where a relation expressed by Expression (103) below holds where D [μm] represents the reference aperture diameter of the single lens group 20, R [μm] represents the reference radius of curvature, and δ [%] represents a variation proportion (perturbation amount) of each of the reference aperture diameter D and the reference radius of curvature R, there is an extremely high possibility that both diffuse reflection properties related to vertical incident light and diffuse reflection properties related to oblique incident light are accepted.

$$\delta \geq \frac{\sqrt{R}}{80^2} \cdot (D-115)^2 - 3 \quad \text{Expression (103)}$$

Consequently, in the reflective diffuser plate 1 according to the present embodiment, it is preferable that the relation of Expression (103) above holds for the reference aperture diameter D, the reference radius of curvature R, and the perturbation amount δ of the single lens group 20.

The reflective diffuser plate 1 according to the present embodiment has been described above in detail with reference to FIG. 1 to FIG. 12C.

The reflective diffuser plate 1 according to the present embodiment as described above can achieve more uniform diffusion angle distribution properties by providing randomness for the location of the single lenses 21 and the shape (aperture diameter and radius of curvature) of the single lenses 21. Further, in the reflective diffuser plate 1 according to the present embodiment, the diffusion angle of light having transmitted through the diffuser plate 1 can be freely designed by controlling the aperture diameter and radius of curvature of the single lenses 21.

(With Regard to Example of Method of Producing Reflective Diffuser Plate)

Figure 13:
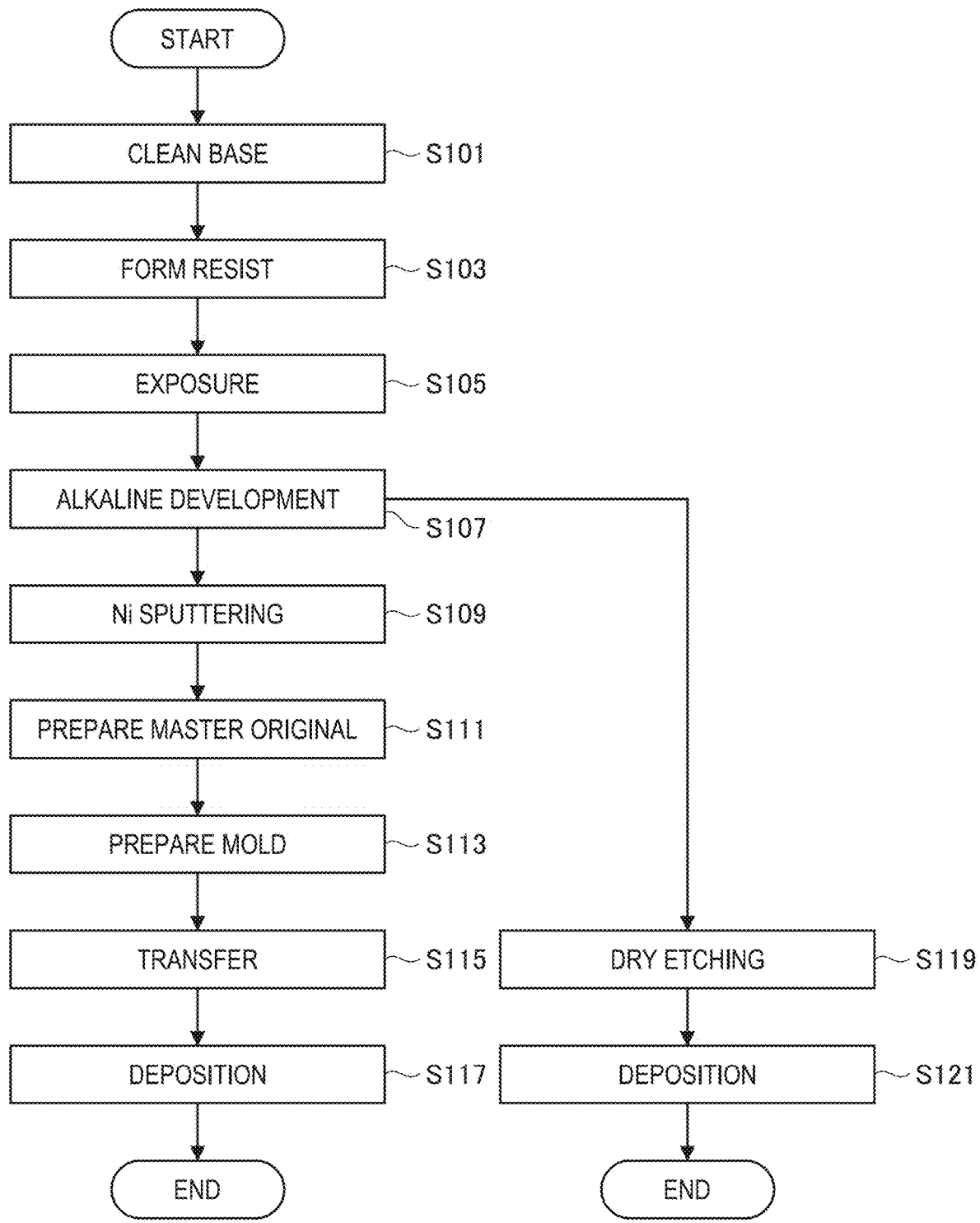
FIG. 13 is a flowchart showing an example of a flow of a method of producing the reflective diffuser plate according to the embodiment.

Hereinafter, an example of a method of producing the reflective diffuser plate 1 according to an embodiment of the present invention will be briefly described with reference to FIG. 13. FIG. 13 is a flowchart showing an example of a flow of the method of producing the reflective diffuser plate according to the present embodiment.

In the method of producing the reflective diffuser plate according to the present embodiment, cleaning of a base is carried out first (step S101). This base may be a roll-like base such as a glass roll, or may be a planar base such as a glass wafer, for example.

Next, a resist (such as a resist in which a metal oxide is used or a resist in which an organic substance is used, for example) is formed on the base after cleaning (step S103). Processing of forming this resist is achieved by application processing or dipping for a roll-like base, and achieved by various kinds of coating processing for a planar base.

Thereafter, exposure processing is carried out on the base on which the resist has been formed (step S105). To this exposure processing, publicly-known various exposure methods, such as exposure through use of a gray scale mask or the like (including multi-exposure performed by overlaying a plurality of gray scale masks), gray scale exposure on a flat plate or a rolled plate, or laser exposure through use of picosecond pulsed laser, femtosecond pulsed laser, or the like, can be applied as appropriate.

Thereafter, by subjecting the base after exposure to alkaline development (step S107) and publicly-known sputtering processing such as Ni sputtering (step S109), a master original (such as a glass master or a metal master, for example) when producing the reflective diffuser plate 1 according to the present embodiment is completed (step S111). Thereafter, a mold such as a soft mold is prepared using the completed master original (step S113).

Next, the reflective diffuser plate 1 according to the present embodiment is produced by carrying out transfer processing on a substrate glass, a substrate film, or the like utilizing the produced mold (step S115) and depositing a reflective film, a protective film, or the like according to necessity (step S117).

On the other hand, in a case of subjecting the glass substrate to direct processing, the reflective diffuser plate 1 according to the present embodiment is produced by carrying out dry etching processing through use of a publicly-known compound such as $CF_4$ (step S119) subsequently to the alkaline development processing in step S107, and thereafter depositing a reflective film, a protective film, or the like according to necessity (step S121).

Note that the flow of the producing method shown in FIG. 13 is merely an example, and the method of producing the reflective diffuser plate according to the present embodiment is not limited to the example shown in FIG. 13.

(Application Examples of Reflective Diffuser Plate)

Next, application examples of the reflective diffuser plate 1 according to the present embodiment will be briefly described.

Note that the reflective diffuser plate 1 according to the present embodiment as described above can be mounted as appropriate in a device that needs to diffuse light to achieve its function. Examples of the device that needs to diffuse light to achieve the function can include a display device such as various displays and a projection device such as a projector.

Further, the reflective diffuser plate 1 according to the present embodiment can also be applied to a backlight of a liquid crystal display device, and can also be used for optical shaping application. Furthermore, the reflective diffuser plate 1 according to the present embodiment can also be applied to various lighting devices.

Note that the device that needs to diffuse light to achieve the function is not limited to the above examples, but the reflective diffuser plate 1 according to the present embodiment can also be applied to any other publicly-known devices that utilize diffusion of light.

EXAMPLES

Next, the reflective diffuser plate according to the present invention will be described specifically while showing examples and comparative examples. Note that the examples which will be described below are mere examples of the reflective diffuser plate according to the present invention, and the reflective diffuser plate according to the present invention is not limited to the following examples.

Test Example 1

Hereinafter, various properties in a case of locating the single lenses 21 by the random locating method on the basis of the reference aperture diameter D [μm], the reference radius of curvature R [μm], and the perturbation amount δ [%] as shown in Table 2 below were simulated utilizing a commercially available application for ray tracing simulation. Note that, in the following simulations, transparent resin or glass was used for the lens material for forming the single lenses 21. Further, a condition for the reflective layer 30 was to deposit a 100-nm reflective layer obtained by using an AgPCu alloy on the surface of the single lens group 20.

Evaluation was made in terms of three points: whether the luminance distribution of diffusely reflected light obtained through simulations had top hat type diffusion properties; whether the luminance distribution at the top part had homogeneity; and whether reflection luminance properties related to oblique incident light were satisfied. Note that respective evaluation standards are indicated below.

[Top Hat Type Diffusion Properties]

A: The luminance distribution of diffusely reflected light has a top hat shape.

B: The luminance distribution of diffusely reflected light does not have a top hat shape.

[Homogeneity]

A: In the luminance distribution of diffusely reflected light with respect to vertical incident light, a luminance change at the top part is less than or equal to 10%.

B: In the luminance distribution of diffusely reflected light with respect to vertical incident light, a luminance change at the top part exceeds 10%.

[Reflection Luminance Properties Related to Oblique Incident Light]

A: The luminance ratio (A/B) of at least either 20-degree incident light or 40-degree incident light falls within the range of 0.3≤A/B≤1.

B: The luminance ratio (A/B) of both of 20-degree incident light and 40-degree incident light falls out of the range of 0.3≤A/B≤1.

Obtained evaluation results are collectively shown in Table 2 below.

TABLE 2

| | Reference aperture diameter D (μm) | Reference radius of curvature R (μm) | Perturbation amount δ (%) | Maximum overlaid amount $O_V$(μm) | Reflective surface | Luminance ratio of oblique incident light A/B | | Top hat type diffusion properties | Homogeneity | Reflection luminance properties of oblique incident light |
|---|---|---|---|---|---|---|---|---|---|---|
| | | | | | | 20° | 40° | | | |
| Example 1 | 45 | 40 | 10 | 11 | front surface | 0.77 | 0.44 | A | A | A |
| Example 2 | 30 | 20 | 5 | 11 | front surface | 0.43 | 0.56 | A | A | A |
| Example 3 | 50 | 30 | 5 | 25 | front surface | 0.85 | 0.55 | A | A | A |
| Example 4 | 80 | 200 | 10 | 36 | front surface | 0.65 | 0 | A | A | A |
| Comparative Example 1 | 30 | 20 | 5 | 11 | rear surface | 0.38 | 0.09 | B | A | A |
| Comparative Example 2 | 30 | 100 | 0 | 15 | front surface | 0.28 | 0 | B | B | B |

Figure 14A:
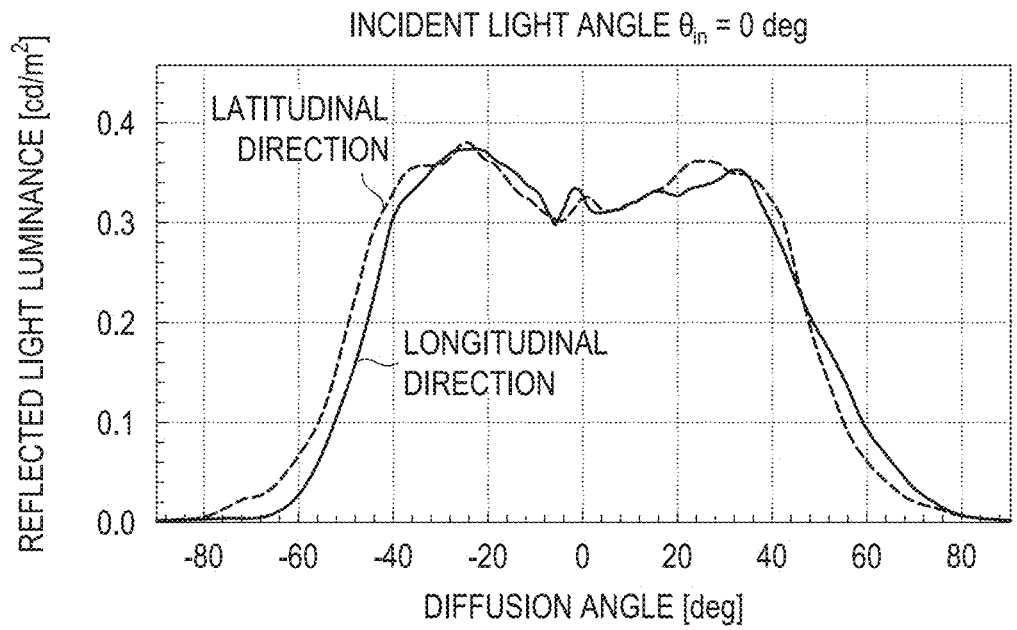
FIG. 14A is a graph showing a test result of Test Example 1 related to the reflective diffuser plate.
Figure 14B:
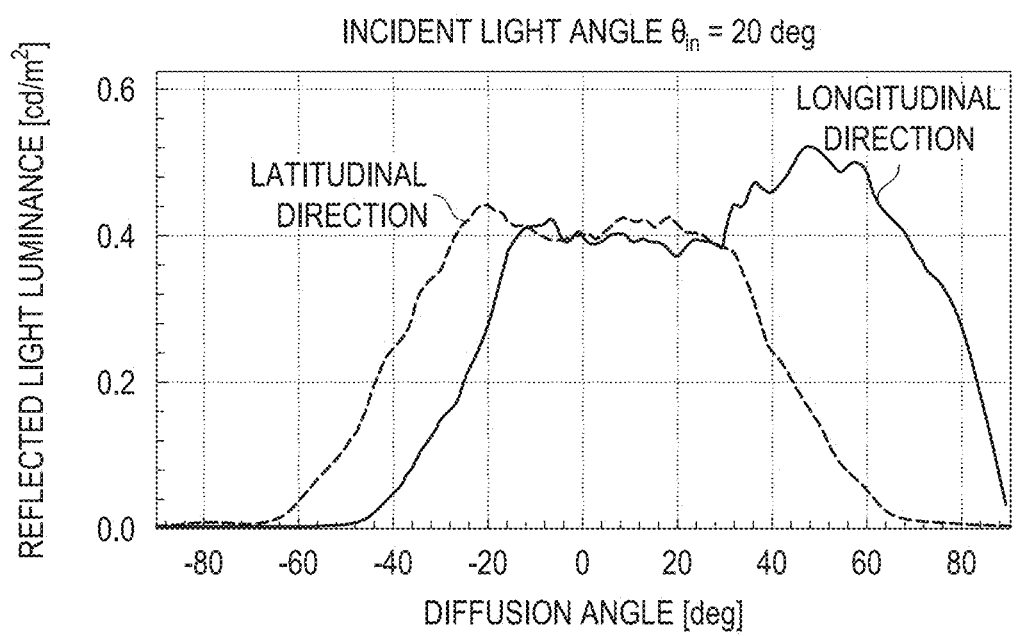
FIG. 14B is a graph showing a test result of Test Example 1 related to the reflective diffuser plate.
Figure 14C:
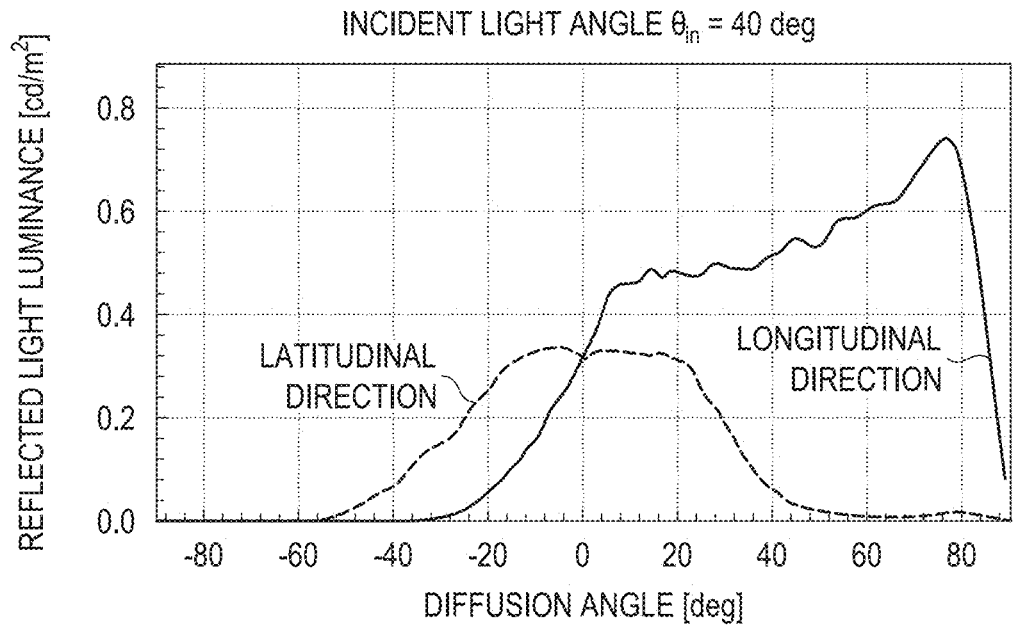
FIG. 14C is a graph showing a test result of Test Example 1 related to the reflective diffuser plate.
Figure 15A:
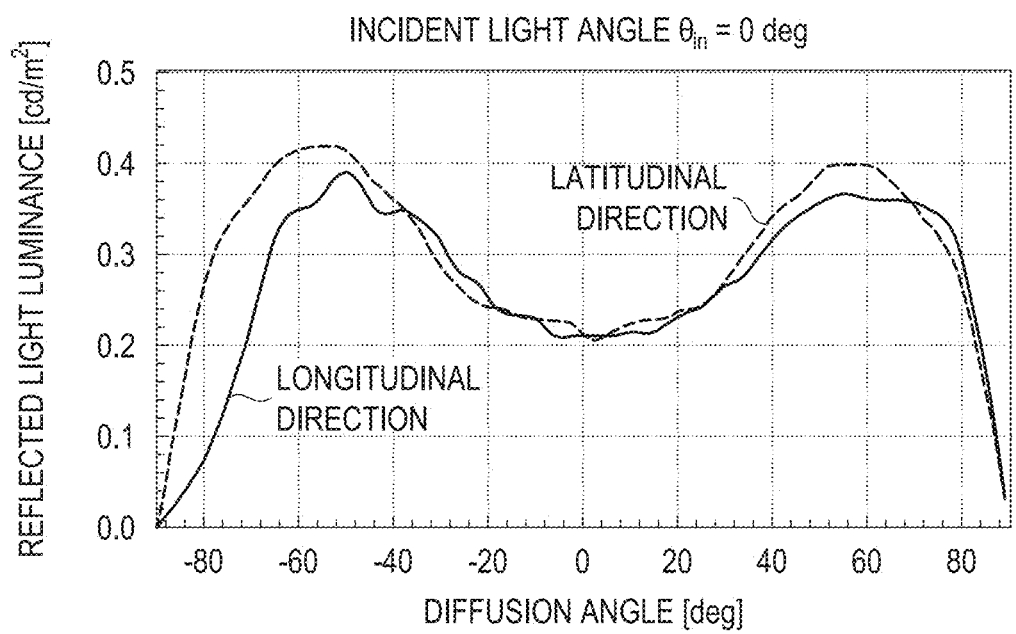
FIG. 15A is a graph showing a test result of Test Example 1 related to the reflective diffuser plate.
Figure 15B:
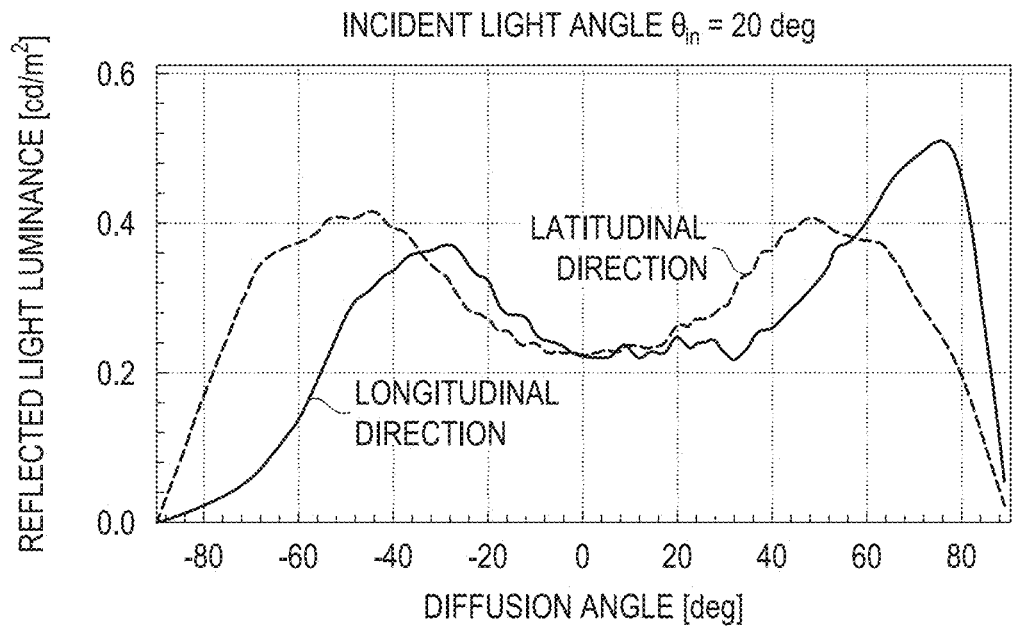
FIG. 15B is a graph showing a test result of Test Example 1 related to the reflective diffuser plate.
Figure 15C:
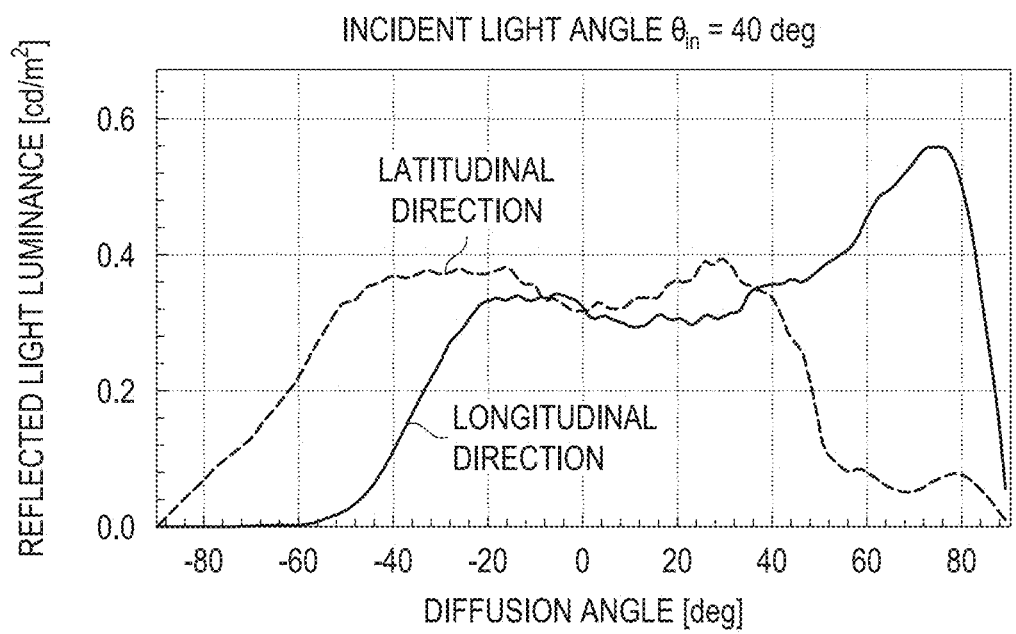
FIG. 15C is a graph showing a test result of Test Example 1 related to the reflective diffuser plate.
Figure 16A:
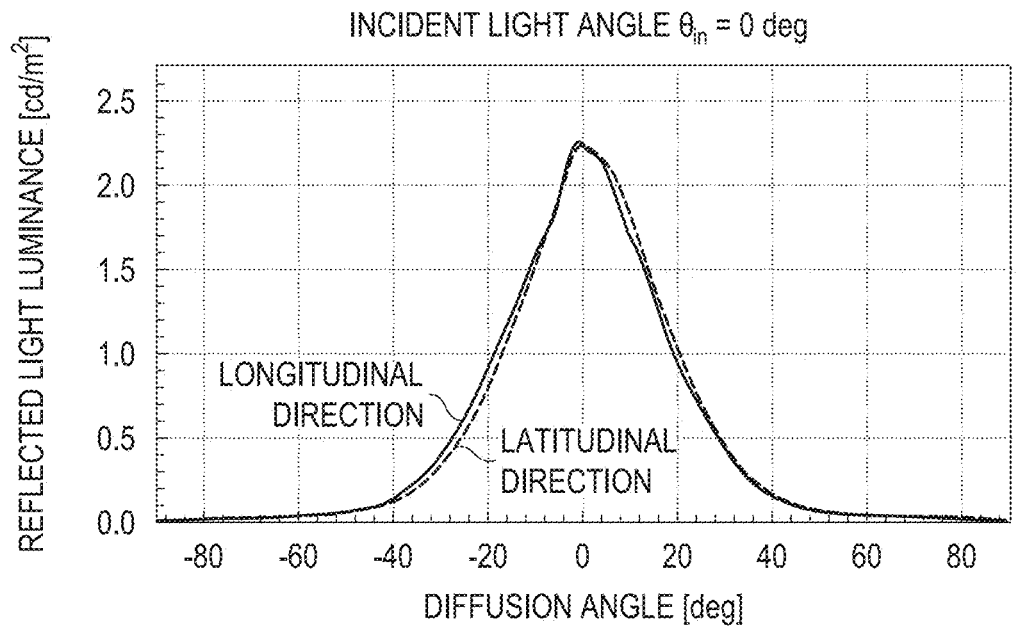
FIG. 16A is a graph showing a test result of Test Example 1 related to the reflective diffuser plate.
Figure 16B:
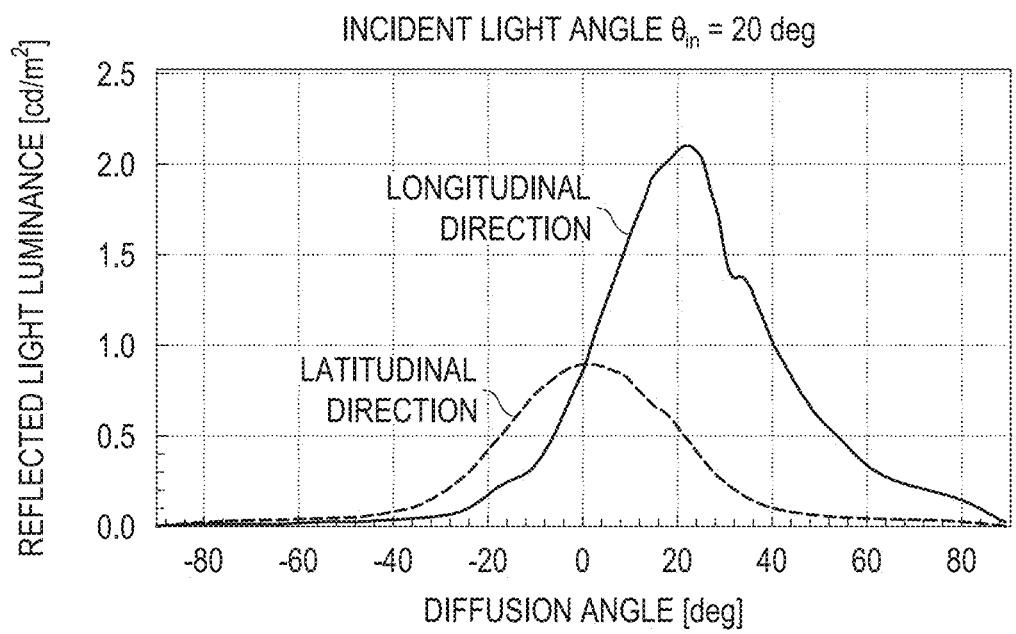
FIG. 16B is a graph showing a test result of Test Example 1 related to the reflective diffuser plate.

Further, for Example 1, Example 2, and Comparative Example 1 described above, the obtained luminance distributions of diffusely reflected light are shown as FIG. 14A to FIG. 16C. FIG. 14A to FIG. 14C show the luminance distributions of diffusely reflected light in a reflective diffuser plate of Example 1, FIG. 15A to FIG. 15C show the luminance distributions of diffusely reflected light in a reflective diffuser plate of Example 2, and FIG. 16A to FIG. 16C show the luminance distributions of diffusely reflected light in a reflective diffuser plate of Comparative Example 1.

Furthermore, for Example 3, Example 4, and Comparative Example 2 described above, the surface shape (look-down projection trajectory) of the single lens group and the manner of distribution of diffusely reflected light in the reflective diffuser plates are shown together as FIG. 17 to FIG. 19. FIG. 17 relates to a reflective diffuser plate of Example 3, FIG. 18 relates to a reflective diffuser plate of Example 4, and FIG. 19 relates to a reflective diffuser plate of Comparative Example 2.

As is also apparent from Table 2 above and FIG. 14A to FIG. 19, it is understood that the reflective diffuser plates corresponding to the examples of the present invention exhibit excellent diffuse reflection properties, whereas the reflective diffuser plates corresponding to the comparative examples of the present invention cannot achieve homogeneous diffuse reflection properties.

Test Example 2

Subsequently, similarly to Test Example 1, diffuse reflection properties in a case of locating the single lenses 21 by the random locating method were simulated assuming that the reference aperture diameter D=80 μm, the reference radius of curvature R=200 μm, and the perturbation amount δ=10%. Note that, in these simulations, transparent resin or glass was used for the lens material for forming the single lenses 21. Further, a condition for the reflective layer 30 was to deposit a 100-nm reflective layer obtained by using an AgPCu alloy on the surface of the single lens group 20.

Figure 20A:
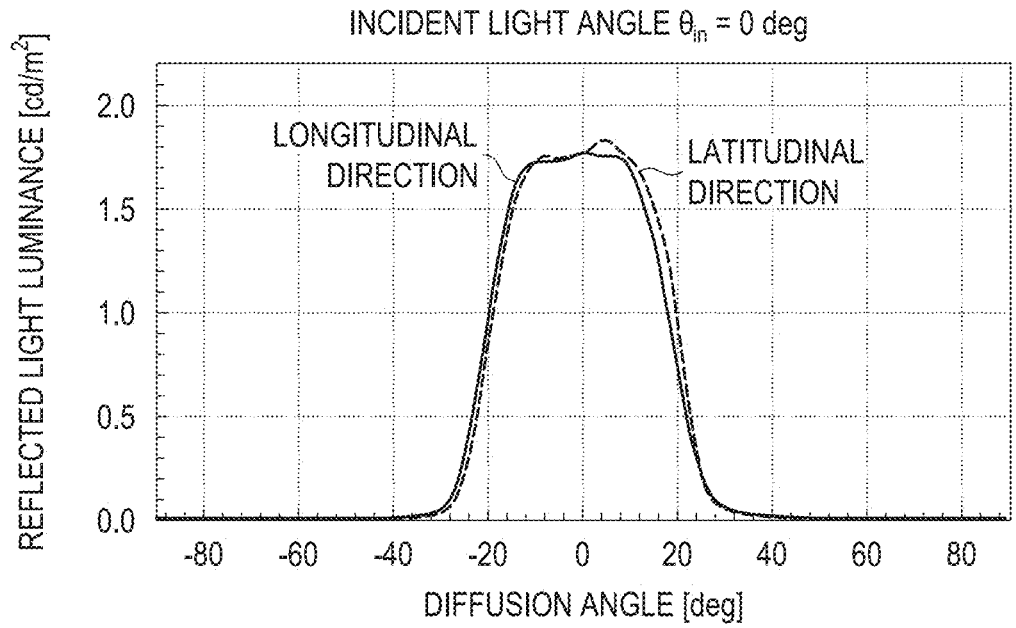
FIG. 20A is a graph showing a test result of Test Example 2 related to the reflective diffuser plate.
Figure 20B:
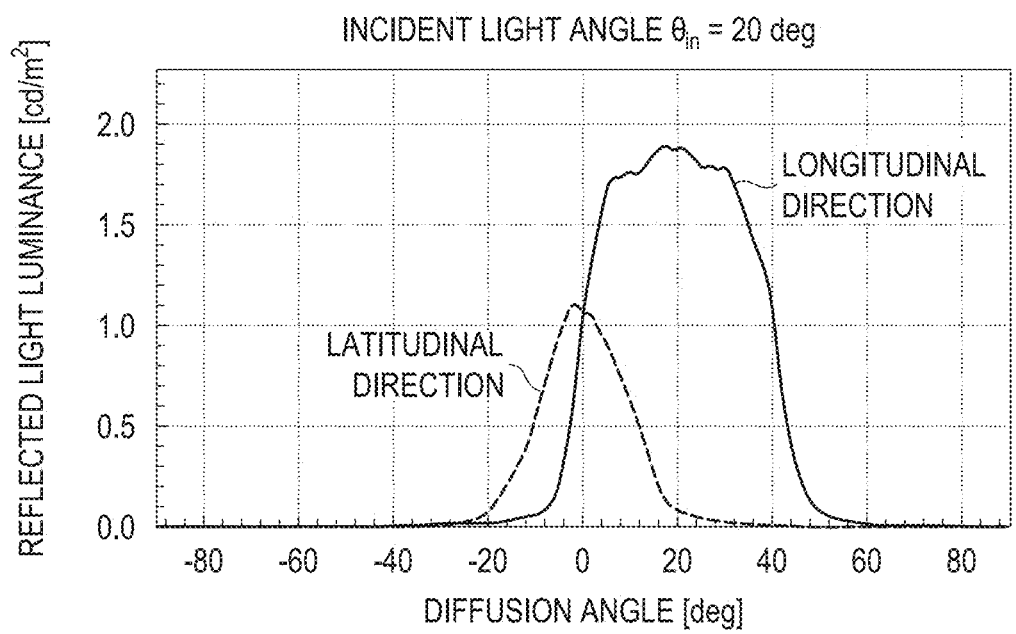
FIG. 20B is a graph showing a test result of Test Example 2 related to the reflective diffuser plate.
Figure 20C:
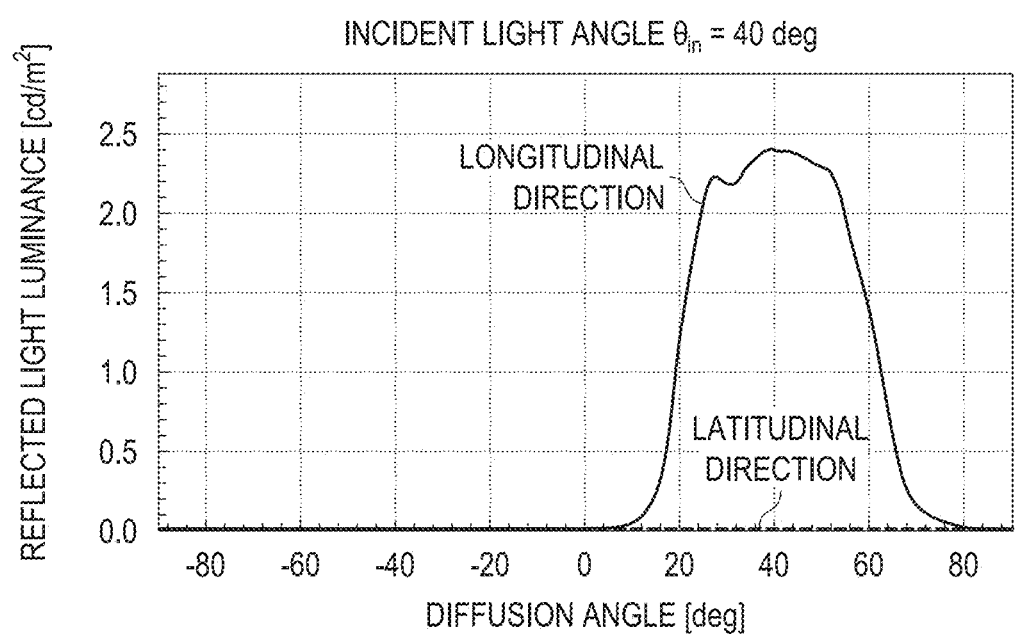
FIG. 20C is a graph showing a test result of Test Example 2 related to the reflective diffuser plate.

Obtained results are shown in FIG. 20A to FIG. 20C.

FIG. 20A is a graph showing diffuse reflection properties at the incident angle $\theta_{in}$=0 degree, FIG. 20B is a graph showing diffuse reflection properties at the incident angle $\theta_{in}$=20 degrees, and FIG. 20C is a graph showing diffuse reflection properties at the incident angle $\theta_{in}$=40 degrees.

Here, in the present test example, the value of luminance ratio (A/B) at the incident angle $\theta_{in}$=20 degrees was 0.65, and the value of luminance ratio (A/B) at the incident angle $\theta_{in}$=40 degrees was 0.

As is apparent from FIG. 20A to FIG. 20C, it is understood that the reflective diffuser plates in the present test example corresponding to the examples of the present invention exhibit excellent diffuse reflection properties.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

1 reflective diffuser plate
10 transparent base material
20 single lens group
21 single lens
30 reflective layer

The invention claimed is:

1. A microlens array reflective diffuser plate including a single lens group positioned on a surface of a transparent base material, wherein
   there are variations in aperture diameter and radius of curvature that respective single lenses constituting the single lens group have in the single lens group as a whole, and vertex positions of the respective single lenses are located irregularly,
   a luminance distribution of reflected light of light vertically incident on the single lens group is substantially uniform in a predetermined diffusion angle range, and
   for at least either light incident on the single lens group from a direction that forms an angle of 20 degrees with a surface normal direction of the transparent base material or light incident on the single lens group from a direction that forms an angle of 40 degrees with the surface normal direction of the transparent base material, a relation of 0.3≤A/B≤1 holds where A represents a reflection luminance value in the surface normal direction, and B represents a peak reflection luminance value of a diffuse reflection component.

2. The reflective diffuser plate according to claim 1, wherein
   a relation expressed by Expression (1) below holds where D [μm] represents the aperture diameter, R [μm] represents the radius of curvature, and δ [%] represents a variation proportion of each of the aperture diameter D and the radius of curvature R.

$$\delta \geq \frac{\sqrt{R}}{80^2} \cdot (D-115)^2 - 3 \qquad \text{Expression (1)}$$

3. The reflective diffuser plate according to claim 1, wherein
   a boundary between one of the single lenses and another adjacent one of the single lenses includes curves different from each other.

4. The reflective diffuser plate according to claim 1, further comprising:
   a reflective layer on a surface of the single lens group.

5. The reflective diffuser plate according to claim 4, wherein
   the reflective layer is a metal layer containing either Al or Ag, or an inorganic reflective layer containing either $TiO_2$ or ZnS.

6. The reflective diffuser plate according to claim 1, wherein
   the respective single lenses constituting the single lens group are located irregularly on the transparent base material, and
   a relation expressed by Expression (2) below holds where $O_V$ [μm] represents a maximum value of an overlying width between two of the single lenses adjacent to each other, and $D_1$ [μm] and $D_2$ [μm] respectively represent aperture diameters of the two single lenses adjacent to each other.

$$\frac{D_1 + D_2}{4} \geq O_V \qquad \text{Expression (2)}$$

7. The reflective diffuser plate according to claim 1, wherein
   the transparent base material is any of a resin substrate, a resin film, and a glass substrate.

8. A display device comprising:
   the reflective diffuser plate as defined in claim 1.

9. A projection device comprising:
   the reflective diffuser plate as defined in claim 1.

10. A lighting device comprising:
    the reflective diffuser plate as defined in claim 1.

* * * * *